(12) United States Patent
Gao et al.

(10) Patent No.: US 11,445,188 B2
(45) Date of Patent: Sep. 13, 2022

(54) PARTITIONING WITH HIGH LEVEL CONSTRAINT

(71) Applicant: Huawei Technologies Co., Ltd., Shenzhen (CN)

(72) Inventors: Han Gao, Munich (DE); Semih Esenlik, Munich (DE); Jianle Chen, San Diego, CA (US); Anand Meher Kotra, Munich (DE); Biao Wang, Munich (DE); Zhijie Zhao, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/204,136

(22) Filed: Mar. 17, 2021

(65) Prior Publication Data

US 2021/0211665 A1 Jul. 8, 2021

Related U.S. Application Data

(63) Continuation of application No. PCT/CN2019/106272, filed on Sep. 17, 2019.
(Continued)

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/1883* (2014.11); *H04N 19/96* (2014.11)

(58) Field of Classification Search
None
See application file for complete search history.

(56) References Cited

U.S. PATENT DOCUMENTS

2016/0127734 A1 5/2016 Nurijanyan
2018/0070110 A1 3/2018 Chuang et al.
(Continued)

FOREIGN PATENT DOCUMENTS

WO 2016131408 A1 8/2016
WO 2018012851 A1 1/2018
WO 2018038492 A1 3/2018

OTHER PUBLICATIONS

Cheng, J., et al., "Algorithm description for Versatile Video Coding and Test Model 1 (VTM 1)," JVET-J1002-v2, Joint Video Experts Team (JVET) of ITU-T SG 16 WP 3 and ISO/IEC JTC 1/SC 29/WG11, 10th Meeting: San Diego, US, Apr. 10-20, 2018, 9 pages.
(Continued)

*Primary Examiner* — Kaitlin A Retallick
(74) *Attorney, Agent, or Firm* — Conley Rose, P.C.

(57) ABSTRACT

A method of image partitioning, comprises determining a first indicator, wherein the first indicator is shared by a first part of a bitstream; determining a partitioning of an image area corresponding to the first part of the bitstream with binary tree (BT) splitting or ternary tree (TT) splitting when the first indicator takes a first value; and determining the partitioning of the image area corresponding to the first part of the bitstream without BT splitting and TT splitting when the first indicator takes a second value, wherein the first value is different from the second value.

20 Claims, 13 Drawing Sheets

Related U.S. Application Data

(60) Provisional application No. 62/733,059, filed on Sep. 18, 2018.

(51) Int. Cl.
*H04N 19/169* (2014.01)
*H04N 19/96* (2014.01)

(56) References Cited

U.S. PATENT DOCUMENTS

| | | |
|---|---|---|
| 2019/0200016 A1 | 6/2019 | Jang et al. |
| 2019/0297325 A1 | 9/2019 | Chang et al. |
| 2020/0014928 A1* | 1/2020 | Hsiang ................. H04N 19/157 |
| 2020/0351517 A1* | 11/2020 | Jeong .................... H04N 19/523 |
| 2021/0092372 A1* | 3/2021 | Misra .................... H04N 19/70 |

OTHER PUBLICATIONS

Bross, B., et al., "Versatile Video Coding (Draft 2)," JVET-K1001-v4, Joint Video Experts Team (JVET) of ITU-T SG 16 WP 3 and ISO/IEC JTC 1/SC 29/WG 11, 11th Meeting: Ljubljana, SI, Jul. 10-18, 2018, 86 pages.

* cited by examiner

PARTITIONING WITH HIGH LEVEL CONSTRAINT

CROSS-REFERENCE TO RELATED APPLICATIONS

This application is a continuation of International Application No. PCT/CN2019/106272, filed on Sep. 17, 2019, which claims priority to U.S. Provisional Patent Application No. 62/733,059, filed on Sep. 18, 2018. The disclosures of the aforementioned applications are hereby incorporated by reference in their entireties.

TECHNICAL FIELD

Embodiments of the present application generally relate to the field of video coding and more particularly to coding unit splitting and partitioning.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. Further video coding standards comprise Moving Picture Experts Group 1 (MPEG-1) video, Moving Picture Experts Group 2 (MPEG-2) video, International Telecommunication Union-Telecommunication Standardization Sector (ITU-T) H.262/MPEG-2, ITU-T H.263, ITU-T H.264/Moving Picture Experts Group 4 (MPEG-4), Part 10, Advanced Video Coding (AVC), ITU-T H.265/High Efficiency Video Coding (HEVC), ITU-T H.266/Versatile Video Coding (VVC) and extensions, e.g. scalability and/or three-dimensional (3D) extensions, of these standards. As the video creation and use have become more and more ubiquitous, video traffic is the biggest load on communication networks and data storage, accordingly, one of the goals of most of the video coding standards was to achieve a bitrate reduction compared to its predecessor without sacrificing picture quality. Even the latest HEVC can compress video about twice as much as AVC without sacrificing quality, it is hunger for new technical to further compress video as compared with HEVC.

SUMMARY

Embodiments of the present application (or the present disclosure) provide apparatuses and methods for encoding and decoding.

According to a first example, a method is provided for image partitioning, the method comprises determining a first indicator, wherein the first indicator is shared by a first part of a bitstream; determining a partitioning of an image area corresponding to the first part of the bitstream with binary tree, BT, splitting or ternary tree, TT, splitting, when the first indicator takes a first value; and determining the partitioning of the image area corresponding to the first part of the bitstream without BT splitting and TT splitting, when the first indicator takes a second value, wherein the first value is different from the second value.

This may provide for a more efficient and flexible control of parameters conveyed by the bitstream.

According to a second example, in addition to the first example, the first indicator takes a second value, further comprising setting the minimum luma size of a coding block from quadtree splitting, MinQtSizeY, as 4 or the minimum luma coding block size, MinCbSizeY; setting the maximum hierarchy depth for multiple type tree splitting, MaxMttDepth, as 0; and setting the maximum luma size of a coding block from BT splitting, MaxBtSizeY, as 0 or MinCbSizeY.

According to a third example, in addition to the first and/or second example, the method further comprises setting the maximum luma size of a coding block from TT splitting, MaxTtSizeY, as 0 or MinCbSizeY.

According to a fourth example, in addition to any of preceding examples, the method further includes deriving the MaxTtSizeY by parsing the bitstream.

According to a fifth example, in addition to any of the preceding examples, the determining of the first indicator comprises deriving the first indicator by parsing the bitstream; or deriving a preset value of the first indicator.

According to a sixth example, in addition to any of the preceding examples, the first indicator is included in a first side information set of the first part of the bitstream.

According to a seventh example, in addition to the sixth example, the first side information set is a sequence parameter set, when the first part is a sequence; or the first side information set is a picture parameter set, when the first part is a picture; or the first side information set is a slice header, when the first part is a slice; or the first side information set is a tile header, when the first part is a tile.

According to an eighth example, in addition to any of the preceding examples, when the first part is a sequence and the first indicator takes the first value, further comprising determining a second indicator, wherein the second indicator is shared by a second part of the bitstream; determining a partitioning of an image area corresponding to the second part of the bitstream with BT splitting or TT splitting, when the second indicator takes a third value; and determining the partition of the image area corresponding to the second part of the bitstream without BT splitting and TT splitting, when the second indicator takes a fourth value, wherein the third value is different from the fourth value.

For instance, image area corresponding to the second part is smaller than the image area corresponding to the first area.

According to a ninth example, in addition to the eighth example, the second part is a picture, a slice or a tile.

According to a tenth example, in addition to the eighth and/or ninth example, determining the second indicator comprises deriving the second indicator by parsing the bitstream; or deriving a preset value of the second indicator.

According to an eleventh example, in addition to the eighth to tenth example, the second indicator is included in a second side information set of the second part of the bitstream, wherein the second part of the bitstream is a part of the first part of the bitstream.

According to a twelfth example, in addition to the eleventh example, when the first part is a sequence, the second side information set is a picture parameter set, when the second part is a picture; or, the second side information set is a slice header, when the second part is a slice; or, the second side information set is a tile header, when the second part is a tile.

According to a thirteenth example, in addition to the eleventh example, when the first part is a picture, the second side information set is a slice header, when the second part is a slice; or, the second side information set is a tile header, when the second part is a tile.

According to a fourteenth example, in addition to the eighth to thirteenth example, the second indicator includes a second BT indicator and a second TT indicator, the method comprising determining the partition of the image area corresponding to the second part of the bitstream with BT splitting, when the second BT indicator takes a ninth value; and determining the partition of the image area corresponding to the second part of the bitstream without BT splitting and TT splitting, when the second indicator takes a tenth value, wherein the ninth value is different from the tenth value; or, determining the partition of the image area corresponding to the second part of the bitstream with TT splitting, when the second TT indicator is takes eleventh value; and determining the partition of the image area corresponding to the second part of the bitstream without TT splitting, when the second indicator takes a twelfth value, wherein the eleventh value is different from the twelfth value.

According to a fifteenth example, in addition to any of the preceding examples, the first indicator includes a first BT indicator and a first TT indicator, the method comprising determining the partitioning of the image area corresponding to the first part of the bitstream with BT splitting, when the first BT indicator takes a fifth value; and determining the partitioning of the image area corresponding to the first part of the bitstream without BT splitting, when the first BT indicator takes a sixth value, wherein the fifth value is different from the sixth value; or, determining the partitioning of the image area corresponding to the first part of the bitstream with TT splitting, when the first TT indicator takes a seventh value; and determining the partitioning of the image area corresponding to the first part of the bitstream without TT splitting, when the first TT indicator takes an eighth value, wherein the seventh value is different from the eighth value.

According to a sixteenth example, an apparatus is provided for image partitioning, comprising a memory and a processor coupled with the memory; and the processor is configured to execute the method of any of the above-mentioned examples.

According to a seventeenth example, an apparatus is provided for image partitioning, comprising a bitstream parsing circuitry for determining a first indicator, wherein the first indicator is shared by a first part of a bitstream; a partitioning setting unit for determining a partitioning of an image area corresponding to the first part of the bitstream with binary tree, BT, splitting or ternary tree, TT, splitting, when the first indicator takes a first value; and for determining the partitioning of the image area corresponding to the first part of the bitstream without BT splitting and TT splitting, when the first indicator takes a second value, wherein the first value is different from the second value.

According to a eighteenth example, a computer program is provided on a non-transitory medium, the program comprising code instructions which when executed on a one or more processors cause the one or more processors to execute method of any of the above-mentioned examples.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
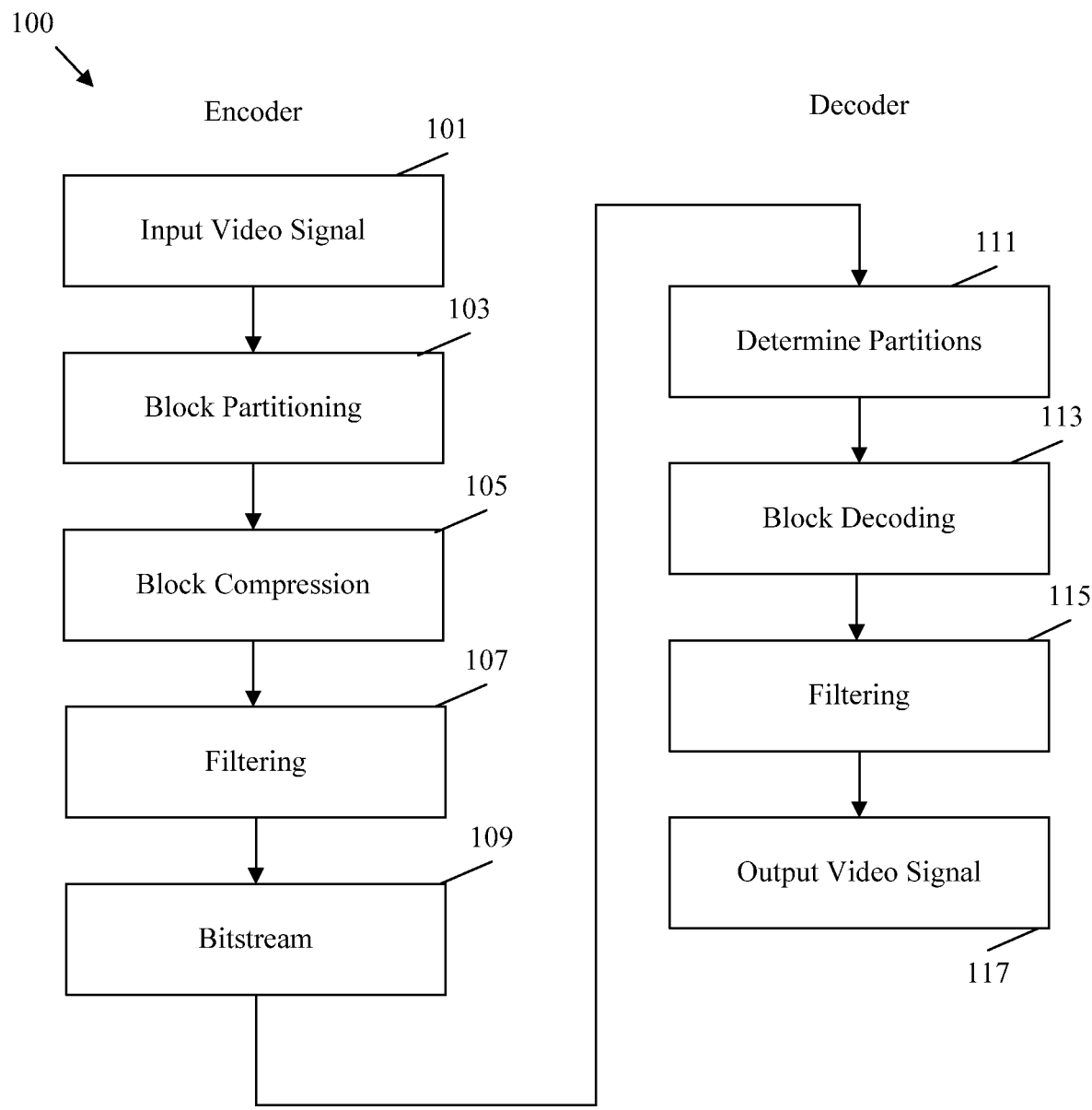
FIG. 1 is a flowchart of an example method of coding a video signal.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three-dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in HEVC (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in subsequent frames. Specifically, an object, such as a table, may remain in a constant position over multiple frames. Hence the table need only be described once and subsequent frames can refer back to the reference frame. Pattern matching mechanisms may be employed to match objects over multiple frames. Further, moving objects may be represented across multiple frames, for example due to object movement or camera movement. As a particular example, video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as a neighbor block in a corresponding direction. Planar mode indicates that a series of blocks along a row (e.g., a plane) can be interpolated based on neighbor blocks at the edges of the row. Planar mode, in effect, indicates a smooth transition of light/color across a row by employing a relatively constant slope in changing values. DC mode is employed for boundary smoothing and indicates that a block is similar/the same as an average value associated with all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block-based prediction discussed above may result in the creation of blocky images at the decoder. Further, the block-based prediction scheme may encode a block and then reconstruct the encoded block for later use as a reference block. The in-loop filtering scheme iteratively applies noise suppression filters, de-blocking filters, adaptive loop filters, and SAO filters to the blocks/frames. These filters mitigate such blocking artefacts such that the encoded file can be accurately reconstructed. Further, these filters mitigate artefacts in the reconstructed reference blocks such that artefacts are less likely to create additional artefacts in subsequent blocks that are encoded based on the reconstructed reference blocks. The in-loop filtering process is discussed in greater detail below.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as variable (e.g., a bit value that may vary depending on context). Entropy coding allows the encoder to discard any options that are clearly not viable for a particular case, leaving only a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are only as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artefacts. Once the frames are filtered, the video signal can be output to a display at step 117 for viewing by an end user.

Figure 2:
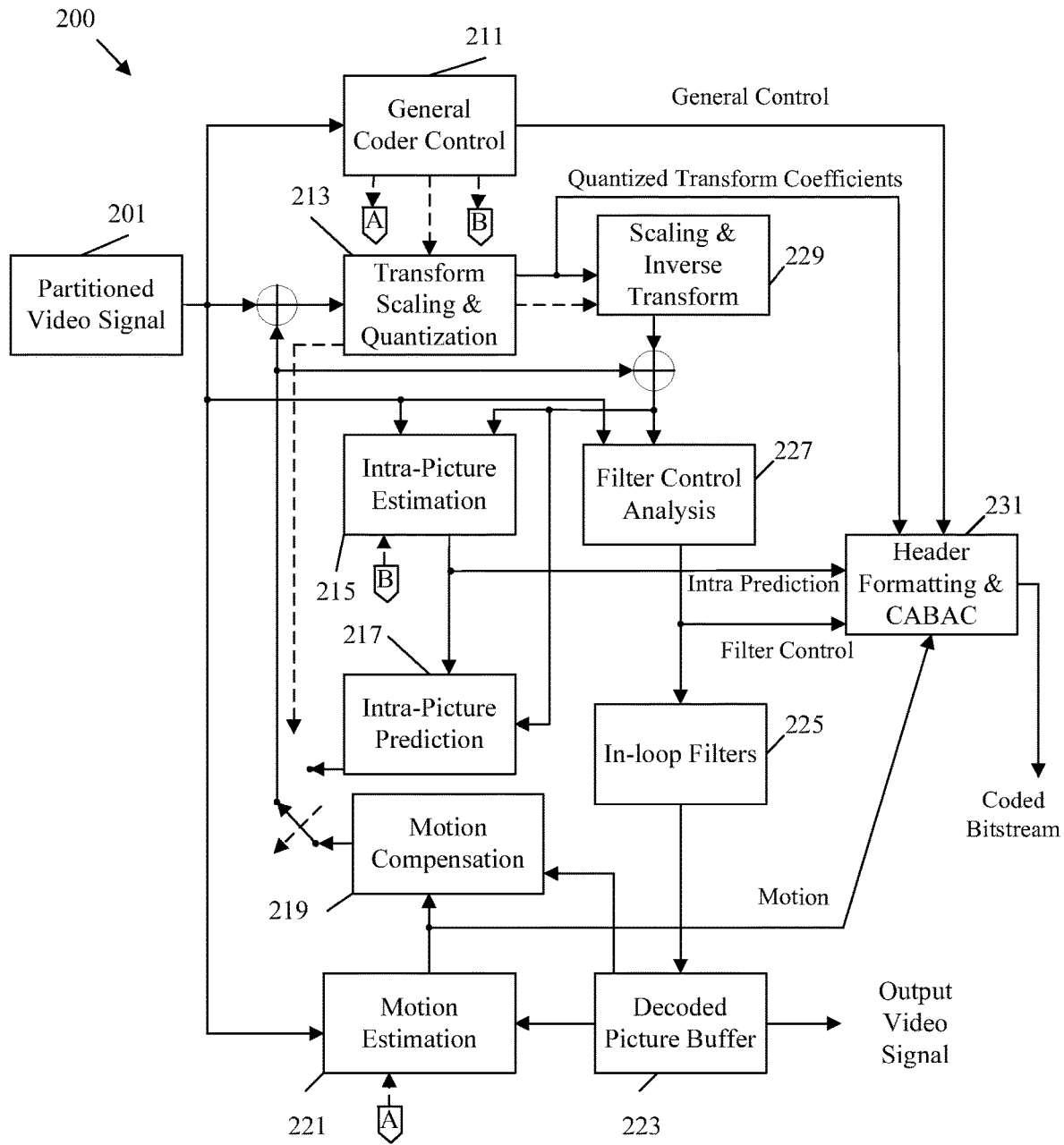
FIG. 2 is a schematic diagram of an example coding and decoding (codec) system for video coding.

FIG. 2 is a schematic diagram of an example coding and decoding (codec) system 200 for video coding. Specifically, coder-decoder (codec) system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filter component 225, a decoded picture buffer component 223, and a header formatting and Context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filter component 225, and the decoded picture buffer component 223. These components are now described.

The partitioned video signal 201 is a captured video stream that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple (ternary) tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manages these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a prediction unit (PU) of a video block relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, codec system 200 may calculate values for sub-integer pixel positions of reference pictures stored in decoded picture buffer 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points a reference picture list. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information such that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artefacts created during scaling, quantization, and transform. Such artefacts could otherwise cause inaccurate prediction (and create additional artefacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer 223 for later use in motion estimation as discussed above. When operating as a decoder, the decoded picture buffer 223 stores and forwards the reconstructed and filtered blocks toward a display as part of an output video signal. The decoded picture buffer 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of a most probable intra-prediction modes, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
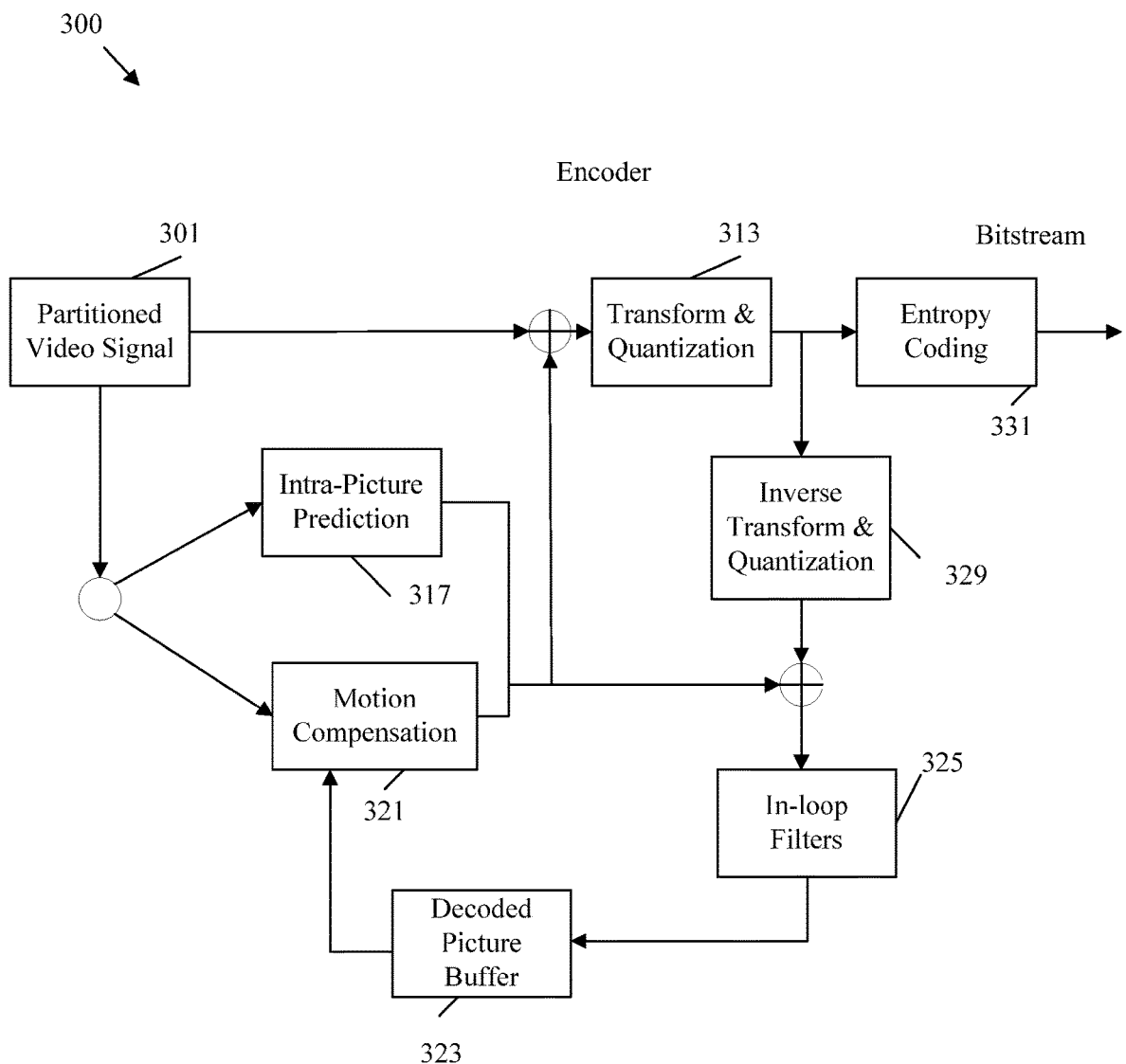
FIG. 3 is a block diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters, including a noise suppression filter as discussed below. The filtered blocks are then stored in a decoded picture buffer 323 for use as a reference blocks by the motion compensation component 321. The decoded picture buffer 323 may be substantially similar to the decoded picture buffer 223.

Figure 4:
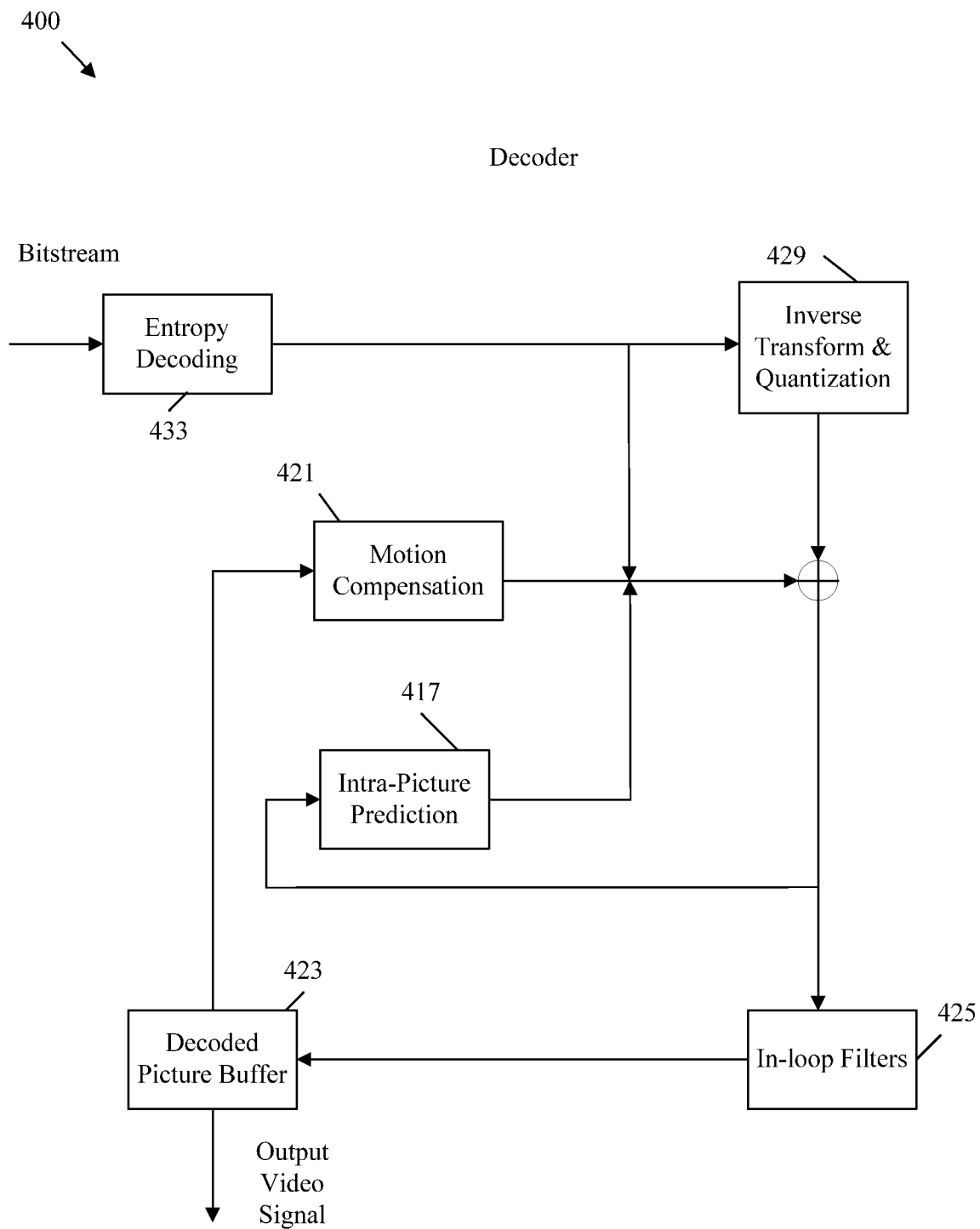
FIG. 4 is a block diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy decoding component 433 performs the reverse function of the entropy encoding component 331. The entropy decoding component 433 is configured to implement an entropy decoding scheme, such as CAVLC, CABAC, SBAC, PIPE coding or other entropy coding technique. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be substantially similar to the inverse transform and quantization component 329.

The reconstructed residual blocks and/or prediction blocks are forwarded to intra-picture prediction component 417 for reconstruction into image blocks based on intra-prediction operations. Intra-picture prediction component 417 may be substantially similar to intra-picture prediction component 317, but operate in reverse. Specifically, the intra-picture prediction component 417 employs prediction modes to locate a reference block in a frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 323 and in-loop filters component 325, respectively. The in-loop filters component 425 filter the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion compensation component 321, but may operate in reverse. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Inter-Prediction

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame).

Inter-prediction is employed when a coding object, such as a coding tree unit (CTU), a coding tree block (CTB), a coding unit (CU), a sub-CU, etc., appears in multiple frames of a video sequence. Rather than coding the same object in each frame, the object is coded in a reference frame and a motion vector (MV) is employed to indicate a motion trajectory of an object. The motion trajectory of an object is the object's movement over time. An MV is a vector that indicates a direction and magnitude of an objects change in position between frames. The object and the MV can be coded in a bitstream and decoded by a decoder. In an effort to further increase coding efficiency and reduce the size of the encoding, the MV may be omitted from the bitstream and derived at the decoder. For example, a pair of reference frames may be employed. A reference frame is a frame in a bitstream that incudes data that can be coded by reference when coding related frames. Matching algorithms, such as bi-lateral matching and/or template matching may be employed to determine the position of the coding object in both reference frames. A bi-lateral matching algorithm matches a block in a previous frame to a block in a current frame. A template matching algorithm matches adjacent blocks to a current block with adjacent blocks to the current block in one or more reference frames. Once the position of the object is determined in both reference frames, an MV can be determined that represents the motion of the object between the reference frames. The MV can then be employed to position the object in the frames between the reference frames. As a specific example, an initial MV can be determined for an entire CU. A local search can then be employed to refine the initial MV. Further, MVs for sub-CU components of the object can be determined and refined based on the refined initial MV. Such an approach indicates the correct position of the object so long as the motion trajectory of the object is continuous between the reference frames.

Figure 5:
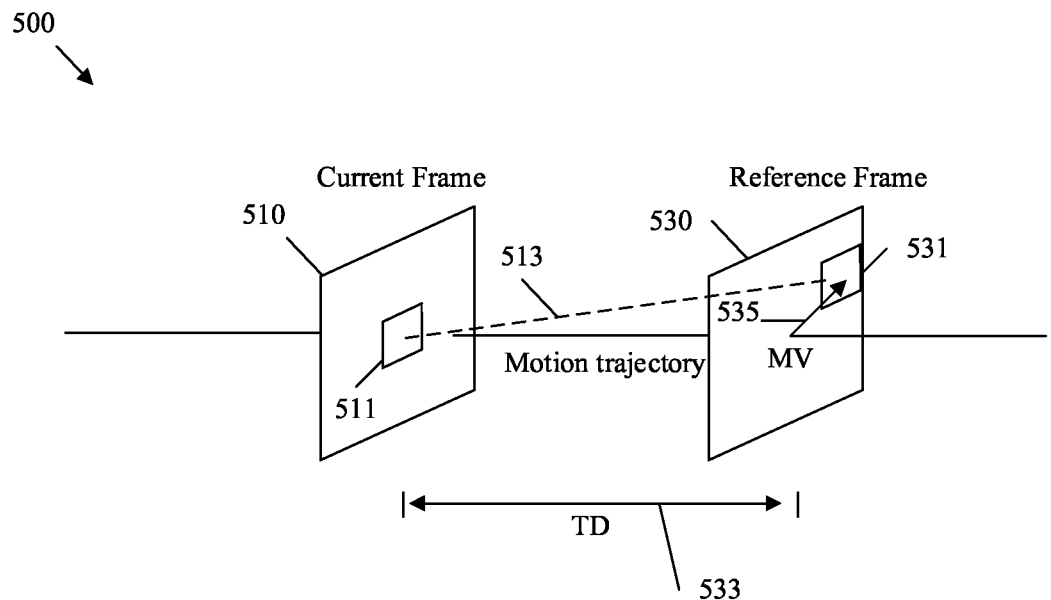
FIG. 5 is a schematic diagram illustrating an example of unidirectional inter-prediction.

FIG. 5 is a schematic diagram illustrating an example of unidirectional inter-prediction 500, for example as performed to determine motion vectors (MVs) at block compression step 105, block decoding step 113, motion estimation component 221, motion compensation component 219, motion compensation component 321, and/or motion compensation component 421.

Unidirectional inter-prediction 500 employs a reference frame 530 with a reference block 531 to predict a current block 511 in a current frame 510. The reference frame 530 may be temporally positioned after the current frame 510 as shown, but may also be temporally positioned before the current frame 510 in some examples. The current frame 510 is an example frame/picture being encoded/decoded at a particular time. The current frame 510 contains an object in the current block 511 that matches an object in the reference block 531 of the reference frame 530. The reference frame 530 is a frame that is employed as a reference for encoding a current frame 510, and a reference block 531 is a block in the reference frame 530 that contains an object also contained in the current block 511 of the current frame 510.

The current block 511 is any coding unit that is being encoded/decoded at a specified point in the coding process. The current block 511 may be an entire partitioned block, or may be a sub-block in the affine inter-prediction case. The current frame 510 is separated from the reference frame 530 by some temporal distance (TD) 533. The TD 533 indicates an amount of time between the current frame 510 and the reference frame 530 in a video sequence. Over the time period represented by the TD 533, the object in the current block 511 moves from a position in the current frame 510 to another position in the reference frame 530 (e.g., the position of the reference block 531). For example, the object may move along a motion trajectory 513, which is a direction of movement of an object over time. A motion vector 535 describes the direction and magnitude of the movement of the object along the motion trajectory 513 over the TD 533. Accordingly, an encoded MV 535 and a reference block 531 provides information sufficient to reconstruct a current block 511 and position the current block 511 in the current frame 510.

Figure 6:
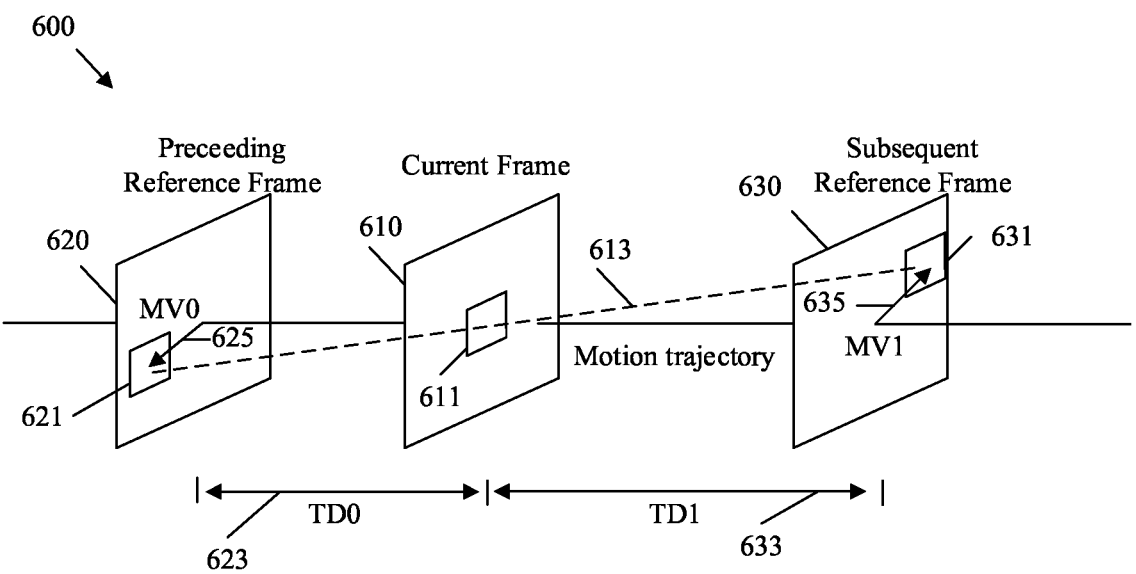
FIG. 6 is a schematic diagram illustrating an example of bidirectional inter-prediction.

FIG. 6 is a schematic diagram illustrating an example of bidirectional inter-prediction 600, for example as performed to determine MVs at block compression step 105, block decoding step 113, motion estimation component 221, motion compensation component 219, motion compensation component 321, and/or motion compensation component 421. For example, bidirectional inter-prediction 600 can be employed to determine motion vectors for a block in inter-prediction modes and/or to determine motion vectors for sub-blocks in affine inter-prediction mode.

Bidirectional inter-prediction 600 is similar to unidirectional inter-prediction 500, but employs a pair of reference frames to predict a current block 611 in a current frame 610. Hence current frame 610 and current block 611 are substantially similar to current frame 510 and current block 511, respectively. The current frame 610 is temporally positioned between a preceding reference frame 620, which occurs before the current frame 610 in the video sequence, and a subsequent reference frame 630, which occurs after the current frame 610 in the video sequence. Preceding reference frame 620 and subsequent reference frame 630 are otherwise substantially similar to reference frame 530.

The current block 611 is matched to a preceding reference block 621 in the preceding reference frame 620 and to a subsequent reference block 631 in the subsequent reference frame 630. Such a match indicates that, over the course of the video sequence, an object moves from a position at the preceding reference block 621 to a position at the subsequent reference block 631 along a motion trajectory 613 and via the current block 611. The current frame 610 is separated from the preceding reference frame 620 by some preceding temporal distance (TD0) 623 and separated from the subsequent reference frame 630 by some subsequent temporal distance (TD1) 633. The TD0 623 indicates an amount of time between the preceding reference frame 620 and the current frame 610 in the video sequence. The TD1 633 indicates an amount of time between the current frame 610 and the subsequent reference frame 630 in the video sequence. Hence, the object moves from the preceding reference block 621 to the current block 611 along the motion trajectory 613 over a time period indicated by TD0 623. The object also moves from the current block 611 to the subsequent reference block 631 along the motion trajectory 613 over a time period indicated by TD1 633.

A preceding motion vector (MV0) 625 describes the direction and magnitude of the movement of the object along the motion trajectory 613 over the TD0 623 (e.g., between the preceding reference frame 620 and the current frame 610). A subsequent motion vector (MV1) 635 describes the direction and magnitude of the movement of the object along the motion trajectory 613 over the TD1 633 (e.g., between the current frame 610 and the subsequent reference frame 630). As such, in bidirectional inter-prediction 600, the current block 611 can be coded and reconstructed by employing the preceding reference block 621 and/or the subsequent reference block 631, MV0 625, and MV1 635.

Intra-Prediction

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame). In intra-prediction, a current image block is predicted from a reference line of samples. The reference line includes samples from adjacent image blocks, also called neighbor blocks. Samples from the current block are matched with samples from the reference line with the nearest luma (light) or chroma (color) values. The current block is coded as prediction modes that indicate the matching samples. The prediction modes include angular prediction modes, direct current (DC) mode, and planar mode. Differences between values predicted by the prediction modes and actual values are coded as residual values in a residual block.

Figure 7:
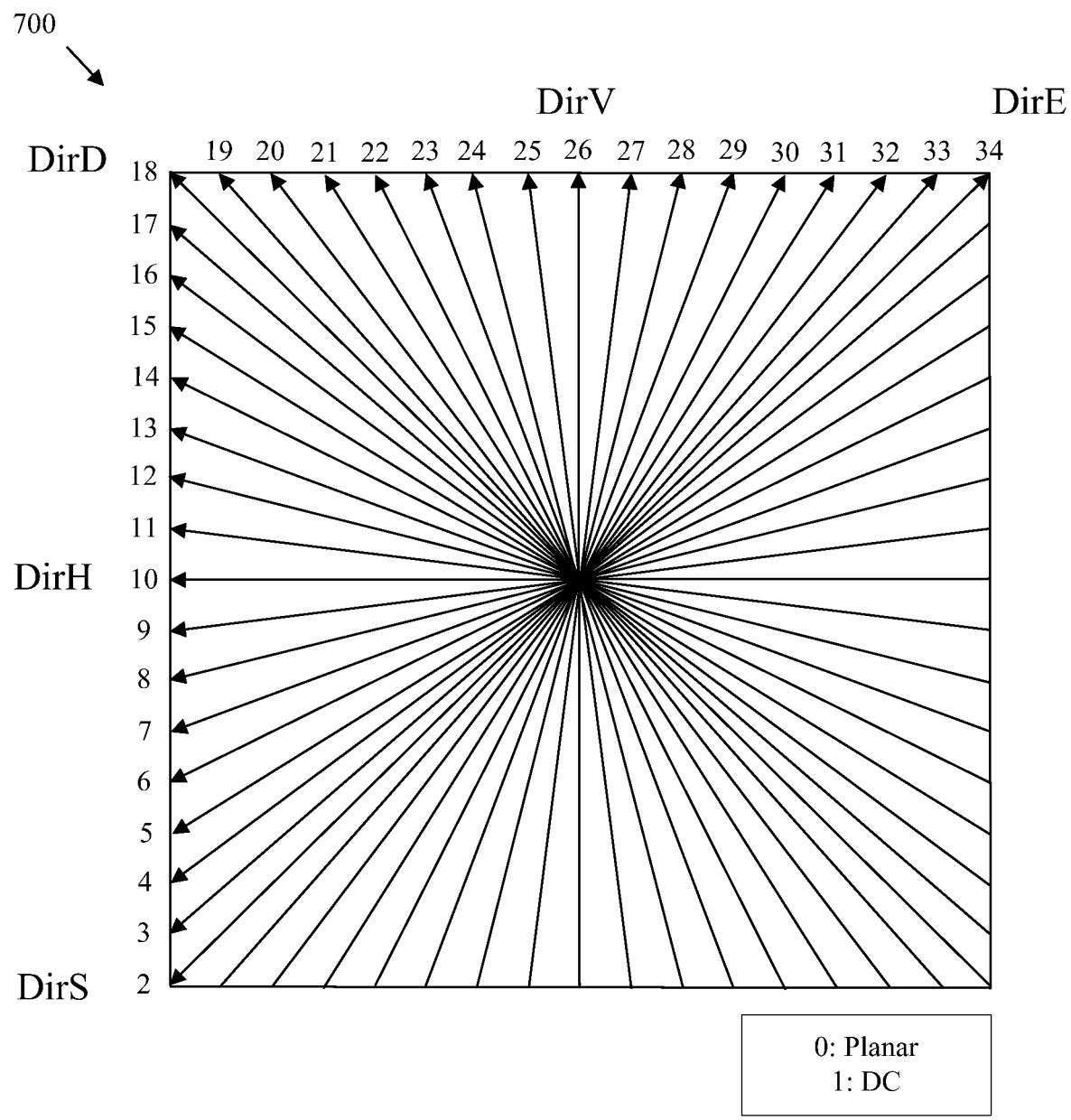
FIG. 7 is a schematic diagram illustrating example intra-prediction modes employed in video coding.

FIG. 7 is a schematic diagram illustrating example intra-prediction modes 700 employed in video coding. For example, intra-prediction modes 700 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400. Specifically, intra-prediction modes 700 can be employed to compress an image block into a prediction block containing a selected prediction mode and a remaining residual block.

As noted above, intra-prediction involves matching a current image block to a corresponding sample or samples of one or more neighboring blocks. The current image block can then be represented as a selected prediction mode index and a residual block, which is much smaller than representing all of the luma/chroma values contained in the current image block. Intra-prediction can be used when there is no available reference frame, or when inter-predication coding is not used for the current block or frame. The reference samples for intra-prediction may be derived from previously coded (or reconstructed) neighboring blocks in the same frame. Advanced Video Coding (AVC), also known as H.264, and H.265/HEVC both employ a reference line of boundary samples of adjacent blocks as reference sample for intra-prediction. In order to cover different textures or structural characteristics many different intra-prediction modes are employed. H.265/HEVC supports a total of thirty-five intra-prediction modes 700 that spatially correlate a current block to one or more reference samples. Specifically, intra-prediction modes 700 include thirty-three directional prediction modes indexed as modes two through thirty-four, a DC mode indexed as mode one, and a planar mode indexed as mode zero.

During encoding, the encoder matches the luma/chroma values of a current block with the luma/chroma values of corresponding reference samples in a reference line across the edges of neighboring blocks. When the best match is found with one of the reference lines, the encoder selects one of the directional intra-prediction modes 700 that points to the best matching reference line. For clarity of discussion, acronyms are employed below to reference particular directional intra-prediction modes 700. DirS denotes the starting directional intra-prediction mode when counting clockwise from the bottom left (e.g., mode two in HEVC). DirE denotes the ending directional intra-prediction mode when counting clockwise from the bottom left (e.g., mode thirty-four in HEVC). DirD denotes the middle directional intra coding mode when counting clockwise from the bottom left (e.g., mode eighteen in HEVC). DirH denotes a horizontal intra prediction mode (e.g., mode ten in HEVC). DirV denotes a vertical intra prediction mode (e.g., mode twenty-six in HEVC).

As discussed above, DC mode acts as a smoothing function and derives a prediction value of a current block as an average value of all the reference samples in the reference line traversing the neighboring blocks. Also as discussed above, planar mode returns a prediction value that indicates a smooth transition (e.g., constant slope of values) between samples at the bottom and top left or top left and top right of the reference line of reference samples.

For Planar, DC, and prediction modes from DirH to DirV, the samples in both the top row of the reference line and the left column of the reference line are used as reference samples. For prediction modes with prediction directions from DirS to DirH (including DirS and DirH), the reference samples in the previously coded and reconstructed neighboring blocks on the left column of the reference line are used as reference samples. For prediction modes with prediction directions from DirV to DirE (including DirV and DirE), the reference samples of the previously coded and reconstructed neighboring blocks on the top row of the reference line are used as reference samples.

Figure 8:
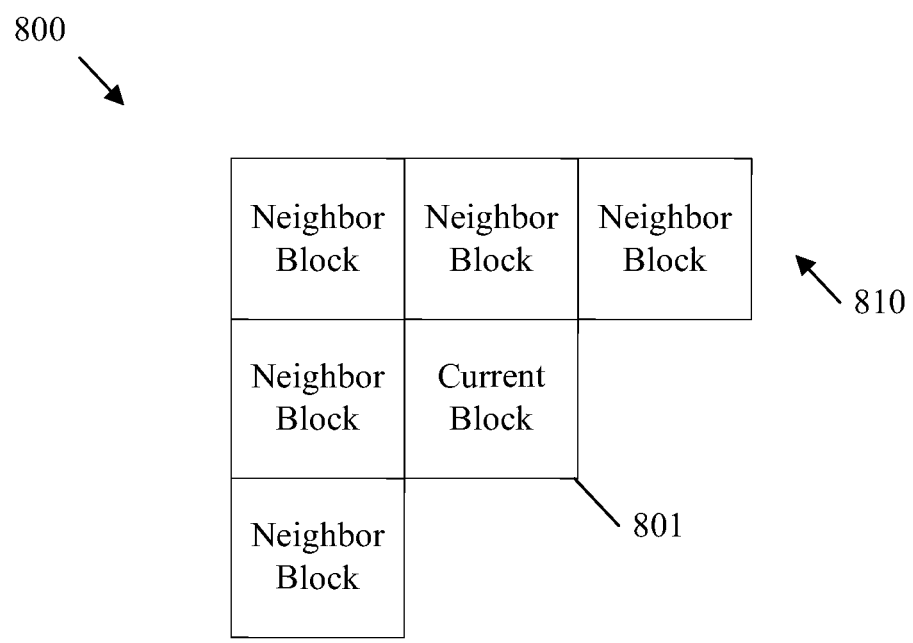
FIG. 8 is a schematic diagram illustrating an example of directional relationships of blocks in video coding.

FIG. 8 is a schematic diagram illustrating an example of directional relationships of blocks 800 in video coding. For example, the blocks 800 may be employed when selecting intra-prediction modes 500. Hence, blocks 800 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400. In video coding, blocks 800 are partitioned based on video content and hence may include many rectangles and squares of varying shapes and sizes. Blocks 800 are depicted as squares for purposes of explanation and are hence simplified from actual video coding blocks to support clarity of discussion.

The blocks 800 contain a current block 801 and neighbor blocks 810. The current block 810 is any block being coded at a specified time. The neighbor blocks 810 are any blocks immediately adjacent to the left edge or top edge of the current block 801. Video coding generally proceeds from top left to bottom right. As such, the neighbor blocks 810 may be been encoded and reconstructed prior to coding of the current block 801. When coding the current block 801, the encoder matches the luma/chroma values of the current block 801 with a reference sample (or samples) from a reference line traversing the edges of the neighboring blocks 810. The match is then employed to select an intra-prediction mode, for example from intra-prediction modes 700, that points to the matched sample (or samples when DC or planar mode are selected). The selected intra-prediction mode then indicates that the luma/chroma values of the current block 801 are substantially similar to the reference sample corresponding to selected intra-prediction mode. Any differences can be retained in a residual block. The selected intra-prediction mode is then encoded in a bitstream. At the decoder, the current block 801 can be reconstructed by employing the luma/chroma values of the reference samples in the selected reference line in the neighboring block 810 that corresponds to the selected intra-prediction mode (along with any residual information from the residual block).

In-Loop Filters

Video coding schemes subdivide video signals into image frames, and then subdivide the image frames into various types of blocks. The image blocks are then compressed. This approach may create visual artefacts when the compressed video signal is reconstructed and displayed. For example, blocky shapes can be artificially added by the image compression process. This is known as blocking, and generally occurs at block partition boundaries. Also, non-linear signal dependent rounding error, known as quantization noise, may also be artificially added to a compressed image. Various filters may be employed to correct for such artefacts. The filters may be applied to reconstructed frames in post processing. Post processing occurs after significant portions of the compressed video signal have been reconstructed and immediately prior to display to a user. The filters may also be applied as part of the compression/decompression process by employing a mechanism called in-loop filtering. In-loop filtering is a filtering scheme that applies filters to reconstructed video images during the encoding and/or decoding process to support more accurate compression between related images. For example, inter-prediction encodes an image frame based on a previous and/or subsequent image frame. At an encoder, a compressed image is reconstructed and filtered via in-loop filtering such that the reconstructed image provides a more accurate image for use in encoding previous/subsequent image frame(s) via inter-prediction. At a decoder, a compressed image is reconstructed and filtered via in-loop filtering both to create a more accurate image for viewing by an end user and to support more accurate inter-prediction. In-loop filtering employs several filters such as a deblocking filter, a sample adaptive offset (SAO) filter, and an adaptive loop filter. In-loop filtering can also include a noise suppression filter.

Figure 9:
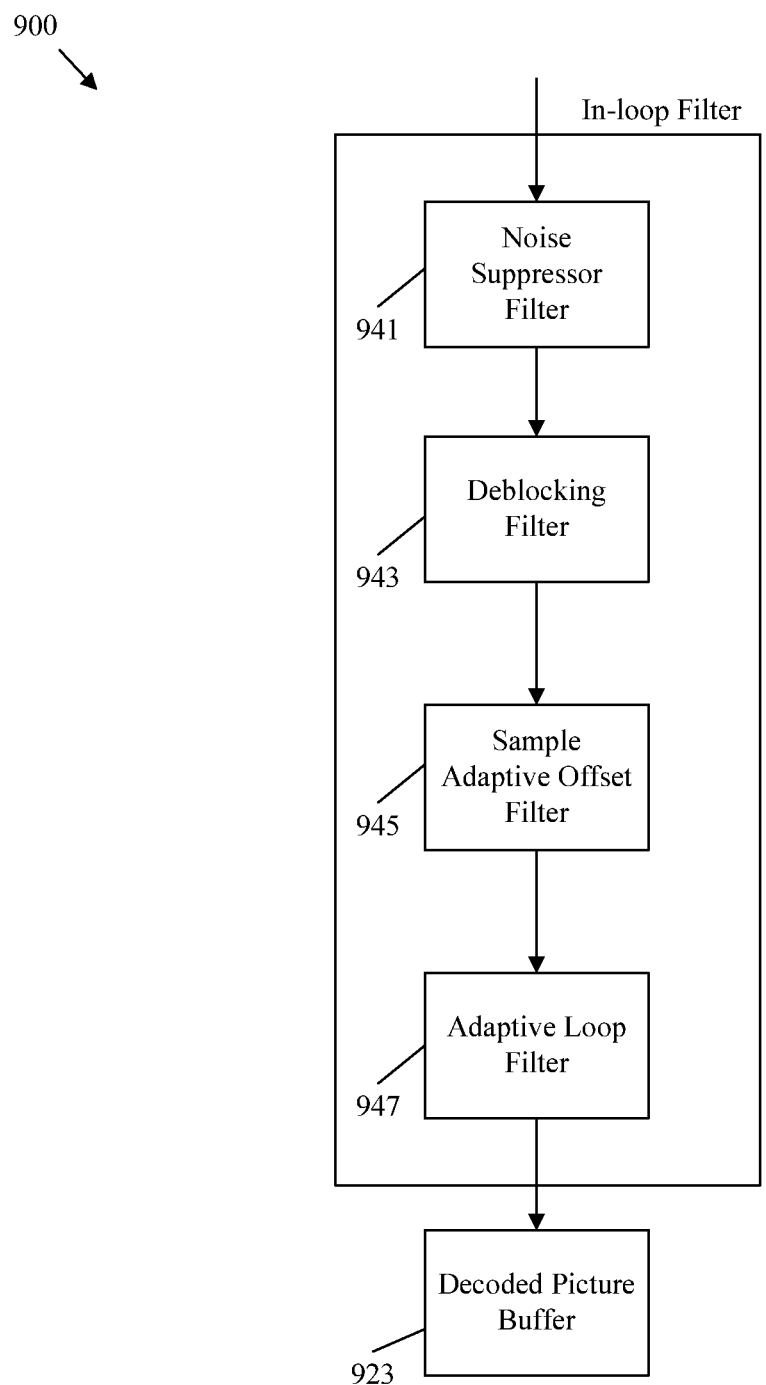
FIG. 9 is a block diagram illustrating an example in-loop filter.

FIG. 9 is a block diagram illustrating an example in-loop filter 900. In-loop filter 900 may be employed to implement in-loop filters 225, 325, and/or 425. The in-loop filter 900 includes a noise suppression filter 941, a deblocking filter 943, a sample adaptive offset (SAO) filter 945, and an adaptive loop filter 947. The filters of in-loop filter 900 are applied in sequence to reconstructed image blocks and/or a residual block.

The noise suppression filter 941 is configured to remove quantization noise caused by image compression. Specifically, the noise suppression filter 941 is employed to remove artefacts that occur at edges in the image. For example, image compression may create distinct and incorrect color/light values adjacent to sharp transitions (edges) between different color/light patches in an image. This is referred to as ringing, and is caused by application of transforms to high frequency portions of the image data that are associated with sharp edges. The noise suppression filter 941 is employed to mitigate such ringing artefacts. The noise suppression filter 941 operates in both the spatial domain (e.g., spatial orientation of pixels) and the frequency domain (e.g., relationship of transformed coefficient values relating to pixel data). At the encoder, the noise suppression filter 941 partitions a reconstructed frame into reference macroblocks. Such blocks can also be sub-divided into smaller reference blocks. The noise suppression filter 941 first generates an application map indicating the portions of the frame that should be filtered based on an estimated amount of quantization noise at the block. The noise suppression filter 941 then employs a matching component to determine, for each reference block as indicated by the application map, a set of patches that are similar to the corresponding reference block, where similar indicates chroma/luma values are within a predetermined range. The noise suppression filter 941 then groups the patches into clusters and may employ a two dimensional (2D) transform to transform the clusters into the frequency domain resulting in frequency domain patches. The noise suppression filter 941 may also employ a reverse 2D transform to convert the frequency domain patches back into the spatial domain.

The deblocking filter 943 is configured to remove block shaped edges created by the blocked based inter and intra prediction. The deblocking filter 943 scans an image portion (e.g., image slice) for discontinuities in chroma and/or luma values occurring at partition boundaries. The deblocking filter 943 then applies a smoothing function to the block boundaries to remove such discontinuities. The strength of the deblocking filter 943 may be varied depending on the spatial activity (e.g., variance of luma/chroma components) occurring in an area adjacent to the block boundaries.

The SAO filter 945 is configured to remove artefacts related to sample distortion caused by the encoding process. The SAO filter 945 at an encoder classifies deblocked samples of a reconstructed image into several categories based on relative deblocking edge shape and/or direction. An offset is then determined and added to the samples based on the categories. The offsets are then encoded in the bitstream and employed by the SAO filter 945 at the decoder. The SAO filter 945 removes banding artefacts (bands of values instead of smooth transitions) and ringing artefacts (spurious signals near sharp edges).

The adaptive loop filter 947, at the encoder, is configured to compare a reconstructed image to an original image. The adaptive loop filter 947 determines coefficients that describe the differences between the reconstructed image and the original image, for example via a Wiener based adaptive filter. Such coefficients are encoded in the bitstream and employed at the adaptive loop filter 947 at the decoder to remove the differences between the reconstructed image and the original image. While the adaptive loop filter 947 is effective in correcting artefacts, greater differences between the reconstructed image and the original image result in a greater number of coefficients to be signaled. This in turn creates a larger bitstream and hence reduces the effectiveness of compression. As such, minimization of differences by other filters prior to applying the adaptive loop filter 947 results in improved compression.

Partitioning

Video coding employs an encoder to compress media files and a decoder to reconstruct the original media files from the compressed media files. Video coding employs various standardized processes to ensure that any decoder employing the standardized process can consistently reproduce a media file as compressed by any encoder also employing the standardized process. For example, an encoder and a decoder may both employ a coding standard such as High efficiency video coding (HEVC), which is also known as H.265. At an encoder, a video signal is separated into frames. Frames are then partitioned into image blocks containing groups of pixels. The image blocks are then compressed, filtered, and encoded into a bitstream. The bitstream may then be transmitted to a decoder, which reconstructs the video signal for display to an end user.

Partitioning systems are configured to split image blocks into sub-blocks. For example, a tree structure employing various split modes can be employed to split a node (e.g., a block) into child nodes (e.g., sub-blocks). Different split modes can be employed to obtain different partitions. Further, split modes can also be applied recursively to further subdivide nodes. Such application of the split modes result in various partition patterns.

Figure 10:
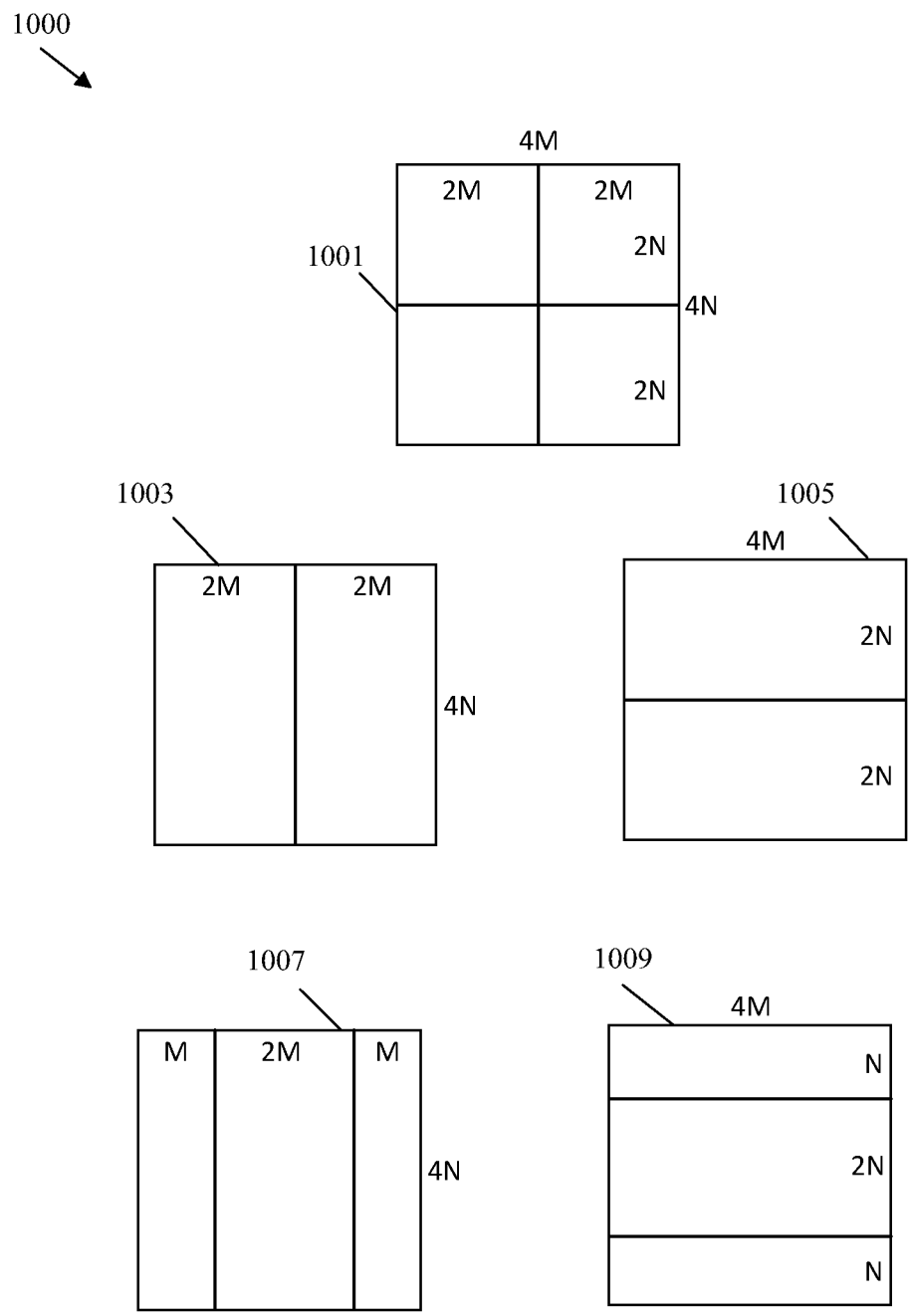
FIG. 10 illustrates example split modes employed in block partitioning.

FIG. 10 illustrates example split modes 1000 employed in block partitioning. A split mode 1000 is a mechanism to split a parent node (e.g., an image block) into a plurality of child nodes (e.g., image sub-blocks) during partitioning. Split modes 1000 include a quad-tree (QT) split mode 1001, a vertical binary tree (BT) split mode 1003, a horizontal BT split mode 1005, a vertical triple tree (TT) split mode 1007, and a horizontal TT split mode 1009. The QT split mode 1001 is a tree structure for block partitioning in which a node of size 4M×4N is split into four child nodes of size M×N, where M indicates block width and N indicates block height. The vertical BT split mode 1003 and horizontal BT split mode 1005 are tree structures for block partitioning in which a node of size 4M×4N is vertically split into two child nodes of size 2M×4N or horizontally split into two child nodes of size 4M×2N, respectively. The vertical TT split mode 1007 and horizontal TT split mode 1009 are tree structures for block partitioning in which a node of size 4M×4N is vertically split into three child nodes of size M×4N, 2M×4N and M×4N; or horizontally split into three child nodes of size 4M×N, 4M×2N and 4M×N, respectively. Among the three child nodes, the largest node is positioned in the center.

Split modes 1000 may also be applied recursively to further divide the blocks. For example, a quad-tree binary-tree (QT-BT) can be created by partitioning a node with QT split mode 1001, and then partitioning each child node (sometimes referred to as quad-tree leaf nodes) with a vertical BT split mode 1003 and/or a horizontal BT split mode 1005. Further, a quad-tree triple tree (QT-TT) can be created by partitioning a node with a quad-tree split, and then partitioning the resulting child nodes with the vertical TT split mode 1007 and/or the horizontal TT split mode 1009.

HEVC operates on a Joint Exploration Model (JEM) application. In JEM, QT-BT block partitioning is employed to partition a coding tree unit (CTU) into a plurality of blocks. TT block partitioning has also been proposed for inclusion into JEM to further enrich block partition types. In video coding based on QT, QT-BT, QT-TT block partitioning split modes, a coding or prediction block in depth K may be split into a number N of smaller coding or prediction blocks of depth K+1 by a BT, TT or QT split mode, where N is set to two, three, or four, respectively. The partition patterns of the split modes are shown in FIG. 10, with the partition patterns indicating the size and position of two or more child nodes split from a parent node.

Transform

Video coding employs an encoder to compress media files and a decoder to reconstruct the original media files from the compressed media files. Video coding employs various standardized processes to ensure that any decoder employing the standardized process can consistently reproduce a media file as compressed by any encoder also employing the standardized process. For example, an encoder and a decoder may both employ a coding standard such as High efficiency video coding (HEVC), which is also known as H.265. H.265 is based on a prediction plus transform framework. At an encoder, video files are separated into frames. Frames are then sub-divided into image blocks containing groups of pixels. Image blocks are further decomposed into prediction blocks containing prediction information, such as prediction modes and motion vector information, and residual blocks containing residual information, such as transform modes, transform coefficients, and quantization parameters. A prediction block and a residual block employ less storage space than an image block, but can be employed by a decoder to reconstruct an image block. The prediction blocks and residual blocks are coded into a bitstream and transmitted to decoder and/or stored for later transmission upon request. At a decoder, the prediction information and the residual information are parsed. The parsed prediction information is then employed to generate prediction samples by employing intra-prediction or inter-prediction. Intra-prediction employs reconstructed image blocks to predict other image blocks in the same frame. Inter-prediction employs reconstructed image blocks to predict other image blocks between adjacent frames. Further, the residual information is employed to generate residual samples, for example by sequentially applying inverse quantization and inverse transforms. The prediction samples and the residual samples are combined to obtain reconstructed samples that correspond to the image blocks coded by the encoder (e.g., for display to an end user on a monitor).

Spatial varying transform (SVT) is a mechanism employed to further improve video coding efficiency. SVT employs a transform block to further compress the residual block. Specifically, a rectangular residual block include a width w and height h (e.g., w×h). A transform block is selected that is smaller than the residual block. Hence, the transform block is employed to transform a corresponding part of the residual block, and leave the remainder of the residual block without additional coding/compression. The rationale behind SVT is that residual information may not be distributed evenly in a residual block. Using a smaller transform block with an adaptive position can capture the majority of the residual information in the residual block, without requiring the entire residual block be transformed. This approach may achieve better coding efficiency than transforming all the residual information in the residual block in some cases. As the transform block is smaller than the residual block, SVT employs a mechanism for signaling the position of the transform relative to the residual block. Such position signaling increases the overall signaling overhead of the coding process, and hence reduces the efficiency of the compression. Additionally, employing the same type of transform block in all cases may not lead to beneficial results in some cases.

Figure 11:
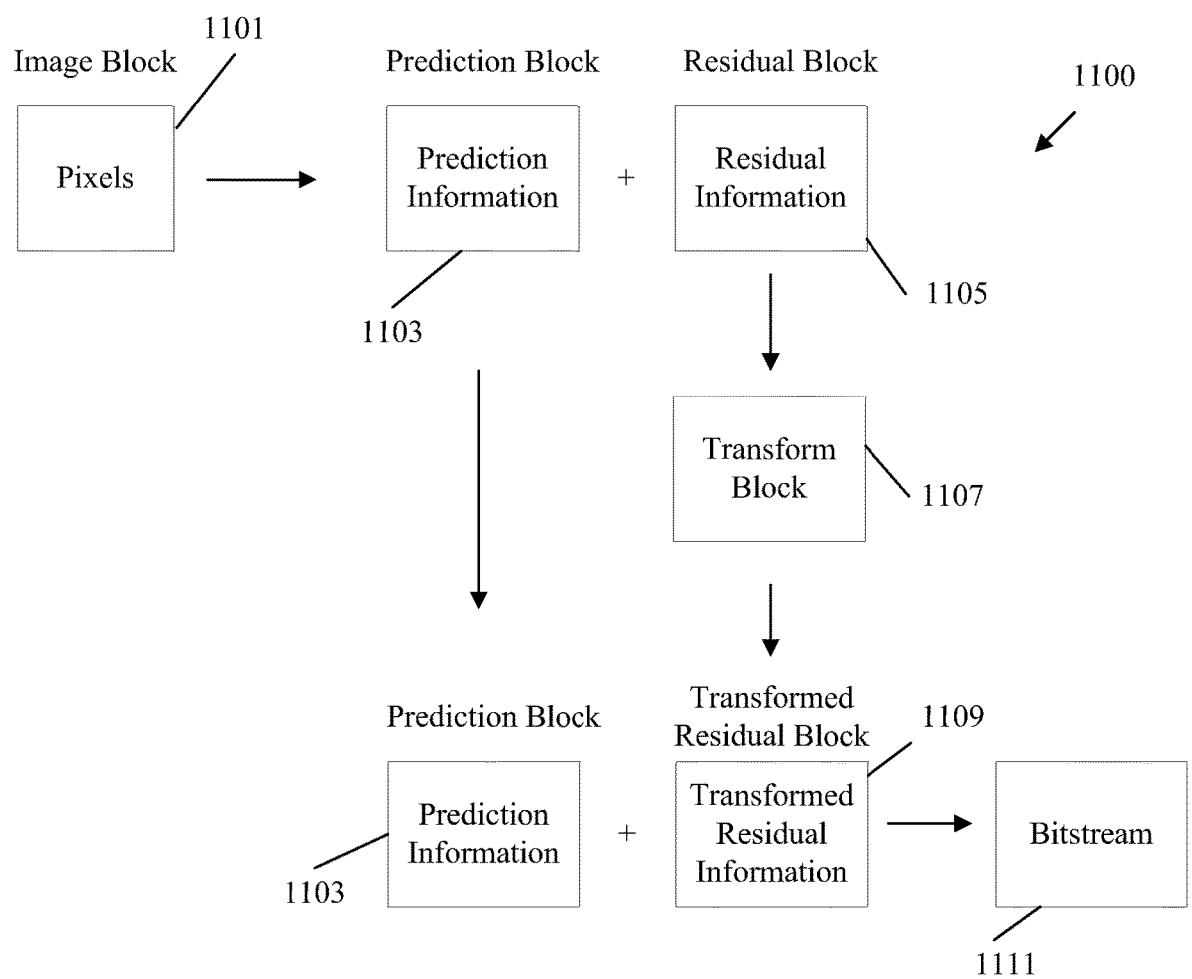
FIG. 11 is a schematic diagram of an example video encoding mechanism.

FIG. 11 is a schematic diagram of an example video encoding mechanism 1100. An image block 1101 can be obtained by an encoder from one or more frames. For example, an image may be split into a plurality of rectangular image regions. Each region of the image corresponds to a Coding Tree Unit (CTU). A CTU is partitioned into a plurality of blocks, such as the coding units in HEVC. Block partition information is then encoded in a bitstream 1111. Accordingly, the image block 1101 is a partitioned portion of an image and contains pixels that represent luma components and/or chroma components at a corresponding portion of the image. During encoding, the image block 1101 is encoded as a prediction block 1103 containing prediction information such as prediction modes for intra-prediction and/or motion vectors for inter-prediction. Encoding the image block 1101 as a prediction block 1103 may then leave a residual block 1105 containing residual information indicating the difference between the prediction block 303 and the image block 301.

It should be noted that an image block 1101 may be partitioned as a coding unit that contains one prediction block 1103 and one residual block 1105. The prediction block 1103 may contain all prediction samples of the coding unit, and the residual block 1105 may contain all residual samples of the coding unit. In such a case, the prediction block 1103 is of the same size as the residual block 1105. In another example, the image block 1101 may be partitioned as a coding unit that contains two prediction blocks 1103 and one residual block 1105. In such a case, each prediction block 1103 contains a portion of the prediction samples of the coding unit, and the residual block 1105 contains all of the residual samples of the coding unit. In yet another example, the image block 1101 is partitioned into a coding unit that contains two prediction blocks 1103 and four residual blocks 1105. The partition pattern of the residual blocks 1105 in a coding unit may be signaled in the bitstream 1111. Such position patterns may include Residual Quad-Tree (RQT) in HEVC. Further, an image block 1101 may contain only luma components (e.g., light), denoted as Y components, of image samples (or pixels). In other cases, the image block 1101 may contain Y, U and V components of image samples, where U and V indicate chrominance components (e.g., color) in a blue luminance and red luminance (UV) colorspace.

Transforms may be employed to further compress the information. Specifically, a transform block 1107 may be employed to further compress the residual block 1105. The transform block 1107 contains a transform, such as inverse Discrete Cosine Transform (DCT) and/or inverse Discrete Sine Transform (DST). The difference between the prediction block 1103 and the image block 1101 is the fit to the transform by employing transform coefficients. By indicating the transform mode of the transform block 1107 (e.g., inverse DCT and/or inverse DST) and the corresponding transform coefficients, the decoder can reconstruct the residual block 1105. When exact reproduction is not required, the transform coefficients can be further compressed by rounding certain values to create a better fit for the transform. This process is known as quantization and is performed according to quantization parameters that describe the allowable quantization. Accordingly, the transform modes, transform coefficients, and quantization parameters of the transform block 1107 are stored as transformed residual information in a transformed residual block 1109, which may also be referred to simply as a residual block in some cases.

The prediction information of the prediction block 1103 and the transformed residual information of the transformed residual block 1109 can then be encoded in a bitstream 1111. The bitstream 1111 can be stored and/or transmitted to a decoder. The decoder can then perform the process in reverse to recover the image block 1101. Specifically, the decoder can employ the transformed residual information to determine the transform block 1107. The transform block 1107 can then be employed in conjunction with the transformed residual block 1109 to determine the residual block 1105. The residual block 1105 and the prediction block 1103 can then be employed to reconstruct the image block 1101. The image block 1101 can then be positioned relative to other decoded image blocks 1101 to reconstruct frames and position such frames to recover the encoded video.

It should be noted that some prediction blocks 1103 can be encoded without resulting in a residual block 1105. However, such a case does not result in the use of a transform block 1107 and hence is not discussed further. Transform blocks 1107 may be employed for inter-predicted blocks or intra-predicted blocks. Further, transform blocks 1107 may be employed on residual blocks 1105 generated by specified inter-prediction mechanisms (e.g., translation model-based motion compensation), but may not be employed to residual blocks 1105 generated by other specified inter-prediction mechanisms (e.g., affine model-based motion compensation).

Figure 12:
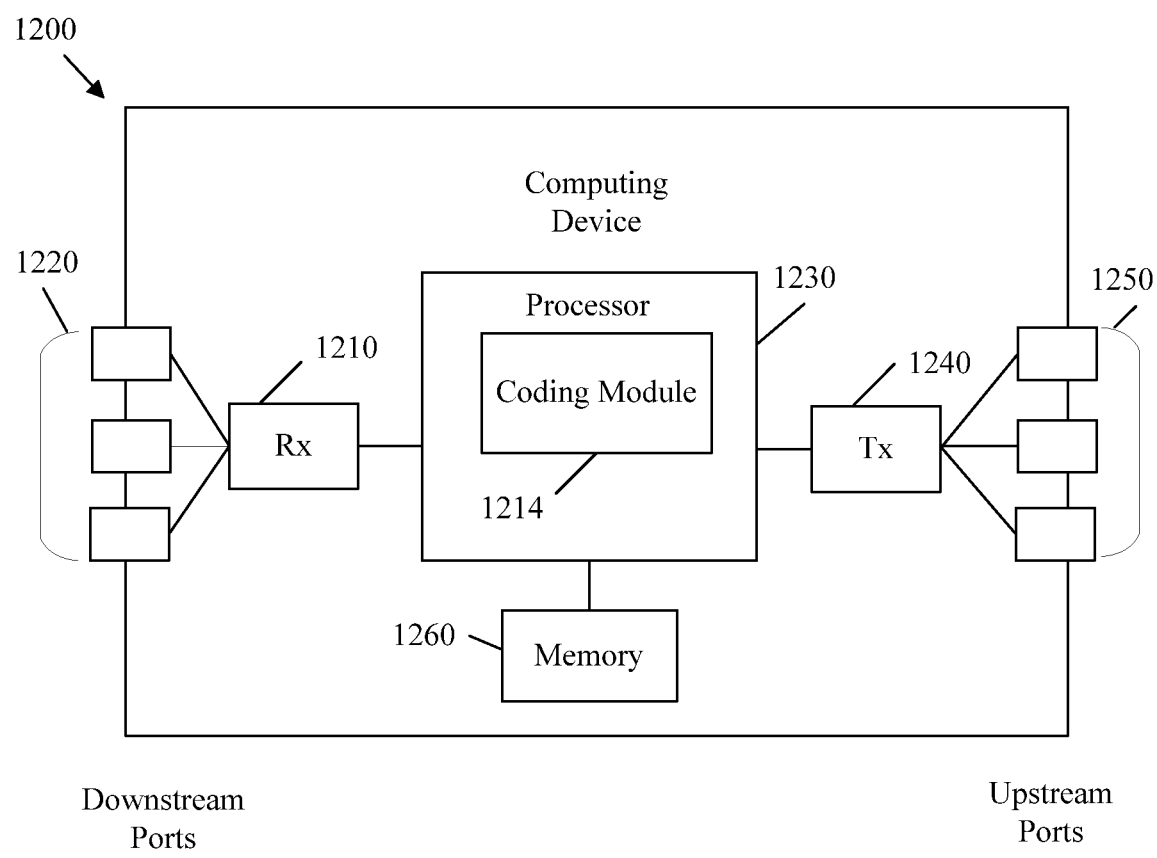
FIG. 12 is a schematic diagram of a computing device for video coding.

FIG. 12 is a schematic diagram of an example computing device 1200 for video coding according to an embodiment of the disclosure. The computing device 1200 is suitable for implementing the disclosed embodiments as described herein. The computing device 1200 comprises ingress ports 1220 and receiver units (Rx) 1210 for receiving data; a processor, logic unit, or central processing unit (CPU) 1230 to process the data; transmitter units (Tx) 1240 and egress ports 1250 for transmitting the data; a memory 1260 for storing the data. The computing device 1200 may also comprise optical-to-electrical (OE) components and electrical-to-optical (EO) components coupled to the ingress ports 1220, the receiver units 1210, the transmitter units 1240, and the egress ports 1250 for egress or ingress of optical or electrical signals. The computing device 1200 may also include wireless transmitters and/or receivers in some examples.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the ingress ports 1220, receiver units 1210, transmitter units 1240, egress ports 1250, and memory 1260. The processor 1230 comprises a coding module 1214. The coding module 1214 implements the disclosed embodiments described above. For instance, the coding module 1214 implements, processes, prepares, or provides the various coding operations. The inclusion of the coding module 1214 therefore provides a substantial improvement to the functionality of the computing device 1200 and effects a transformation of the computing device 1200 to a different state. Alternatively, the coding module 1214 is implemented as instructions stored in the memory 1260 and executed by the processor 1230 (e.g., as a computer program product stored on a non-transitory medium).

The memory 1260 comprises one or more disks, tape drives, and solid-state drives and may be used as an overflow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM). The computing device 1200 may also input/output (I/O) device for interacting with an end user. For example, the computing device 1200 may include a display, such as a monitor, for visual output, speakers for audio output, and a keyboard/mouse/trackball, etc. for user input.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

In an embodiment, a syntax element of MinQtSizeY (indicating minimum quad-tree size for luma) and/or a syntax element of MaxMttDepth (indicating maximum multi-type tree depth of partitioning) are signaled in a parameter set such as the Sequence Parameter Set, SPS, within the bitstream. In particular, syntax elements log 2_min_qt_size_intra_slices_minus2 and log 2_min_qt_size_inter_slices_minus2 may be signalled for MinQtSizeY separately for the intra and inter slices respectively. Moreover, the syntax elements max_mtt_hierarchy_depth_inter_slices and max_mtt_hierarchy_depth_intra_slices may be signaled for MaxMttDepth for the intra and inter slices respectively within the bitstream, e.g. within the parameter set such as the SPS. However, for the present disclosure it is not necessary that syntax elements for both intra and inter slices are signaled. In general, any one of them or both may be signaled.

Moreover, a syntax element (log 2_diff_ctu_max_bt_size) of the difference between the luma coding tree block, CTB, size and MaxBtSizeY (maximum binary-tree size for luma) is signaled in the slice header. It is noted that even through in this example, the parameter are mentioned to be for luma component, in general, these parameters may be for any component such as one or more chroma components or it may be the same parameter used for both luma and chroma, or the like.

MinQtSizeY is defined as the minimum luma size of a leaf block resulting from quadtree splitting of a coding tree unit (CTU). The size can indicate either the width or height of the block in number of samples. It might also indicate the width and the height together in the case of square blocks. As an example, if the MinQtSizeY is equal to 16 (samples/pixels), a coding block that has a size smaller than or equal to 16 cannot be partitioned into child block using the quadtree splitting method. MinQtSizeY, signaled in syntax elements log 2_min_qt_size_intra_slices_minus2 and/or log 2_min_qt_size_inter_slices_minus2 is used to indicate the minimum quadtree block size. Please note that the indication of the size can be an indirect indication, meaning that log 2_min_qt_size_intra_slices_minus2 might be the binary logarithm, log 2 (base 2), of the number of luma samples of the minimum quadtree block. In other words, the MinQtSizeY does not have to be signaled directly. Rather, in order to reduce overhead, the logarithm of MinQtSizeY can be signaled. In order to even further reduce the range of the syntax element signaling MinQtSizeY, the log 2 value of MinQtSizeY may be subtracted 2, if it can be assumed that the smallest block size is 2 samples. The MinQtSizeY parameter can differ for inter and intra predicted image areas. Accordingly, there may be separate MinQtSizeY parameters signaled respectively for intra slices (log 2_min_qt_size_intra_slices_minus2) or tiles or the like and for inter slices (log 2_min_qt_size_inter_slices_minus2) or tiles or the like.

MaxMttDepth is defined as the maximum hierarchy depth for coding units resulting from multi-type tree (MTT) splitting of a quadtree leaf or CTU. An MTT splitting (partitioning) means that more than one types of splitting are allowed (possible), such as binary tree, quad-tree, ternary tree or the like. A coding tree unit (or coding tree block (CTB) describes the maximum block size that is used to partition a picture frame. MaxMttDepth describes the upper limit for the number of consecutive binary or ternary splitting that can be applied to obtain a child block. As an example, assume the CTU size is 128×128 (width equal to 128 and height equal to 128), and MaxMttDepth is equal to 1. In this case the parent block (128×128 in size) can first be split into two 128×64 child blocks using binary splitting. However, the child blocks cannot apply any consecutive binary splitting (to result in either 128×32 or 64×64 child blocks) since the maximum number (depth) of allowed binary splitting is reached. It is noted that MaxMttDepth can control maximum binary splitting depth or maximum ternary splitting depth, or both at the same time. If it controls both binary and ternary splitting at the same time, 1 binary split followed by 1 ternary split can be counted as 2 hierarchical splits. MaxMttDepth, which may be signaled with syntax elements max_mtt_hierarchy_depth_inter_slices and/or max_mtt_hierarchy_depth_intra_slices is used to indicate the maximum hierarchy depth for coding units resulting from multi-type tree.

It is noted that the names of the syntax elements are used as they appear in other approaches, or using the same principles of naming these syntax elements. However, it should be clear that the names can be changed, therefore what should be considered important is the logical meaning of the syntax elements. In this example, the MaxMttDepth parameter can be provided separately for inter slices (max_mtt_hierarchy_depth_inter_slices) and for intra slices (max_mtt_hierarchy_depth_intra_slices).

MaxBtSizeY is defined as the maximum luma size (width or height), in terms of number of samples, of a coding block that can be split using a binary split. As an example, if MaxBtSizeY is equal to 64, a coding block that is bigger in size either in width or height cannot be split using binary splitting. This means that a block that has a size 128×128 cannot be split using binary splitting, whereas a block that has a size 64×64 can be split using binary splitting.

MinBtSizeY is defined as the minimum luma size (width or height), in terms of number of samples, of a coding block that can be split using a binary split. As an example, if MinBtSizeY is equal to 16, a coding block that is smaller or equal in size either in width or height cannot be split using binary splitting. This means that a block that has a size 8×8 cannot be split using binary splitting, whereas a block that has a size 32×32 can be split using binary splitting.

MinCbSizeY is defined as the minimum coding block size. As an example, MinCbSizeY can be equal to 8, which means that a parent block that has a size 8×8 cannot be split using any of the splitting methods since the resulting child block is guaranteed to be smaller than the MinCbSizeY in either width or height. According to a second example, if MinCbSizeY is equal to 8 a parent block that has a size 8×16 cannot be partitioned using e.g. quadtree splitting, since the resulting four child blocks would have a size of 4×8 (width equal to 4 and height equal to 8), and the width of the width of the resulting child blocks would be smaller than MinCbSizeY. In the second example it was assumed that MinCbSizeY applies to both width and height of the block, although 2 different syntax elements can be used to independently limit the width and height.

MinTbSizeY is defined as the minimum transform block size, in terms of number of samples, of a coding block that can be split using a ternary split. As an example, if MinTbSizeY is equal to 16, a coding block that is smaller or equal in size either in width or height cannot be split using ternary splitting. This means that a block that has a size 8×8 cannot be split using ternary splitting, whereas a block that has a size 32×32 can be split using ternary splitting.

It is noted that, as also in the previous example concerning MinQtSizeY, any of the above-mentioned parameters may be signaled by its log 2 value or by its log 2 value minus 2 or in another way. The signaling may be performed separately for intra and inter slices or for other types or modes of prediction/coding.

An example of an SPS syntax (RBSP standing for Raw Byte Sequence Payload) is shown below, following Section 7.3.2.1 of Joint Video Experts Team (JVET)-K1001-v4.

Sequence Parameter Set RBSP Syntax

| (Preliminary basic SPS) | |
|---|---|
| | Descriptor |
| seq_parameter_set_rbsp( ) { | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   qtbtt_dual_tree_intra_flag | ue(v) |
|   log2_ctu_size_minus2 | ue(v) |
|   log2_min_qt_size_intra_slices_minus2 | ue(v) |
|   log2_min_qt_size_inter_slices_minus2 | ue(v) |
|   max_mtt_hierarchy_depth_inter_slices | ue(v) |
|   max_mtt_hierarchy_depth_intra_slices | ue(v) |
|   sps_cclm_enabled_flag | ue(1) |
|   sps_mts_intra_enabled_flag | ue(1) |
|   sps_mts_inter_enabled_flag | ue(1) |
|   rbsp_trailing_bits( ) | |
| } | |

Similarly, Slice Header syntax according to section 7.3.3 of JVET-K1001-v4 (Preliminary basic slice header) is shown below.

| Slice header syntax (following Section 7.3.3 of JVET-K1001-v4) | |
|---|---|
| | Descriptor |
| slice_header( ) { | |
|   slice_pic_parameter_set_id | ue(v) |
|   slice_address | u(v) |
|   slice_type | ue(v) |
|   if ( slice_type != I ) | |
|     log2_diff_ctu_max_bt_size | ue(v) |
|   dep_quant_enabled_flag | u(1) |
|   if( !dep_quant_enabled_flag ) | |
|     sign_data_hiding_enabled_flag | u(1) |
|   byte alignment( ) | |
| } | |

The semantics for the RB SP syntax mentioned above is provided in the following based on Section 7.4.3.1 of JVET-K1001-v4.

Sequence Parameter Set RBSP Semantics log 2_ctu_size_minus2 plus 2 specifies the luma coding tree block size of each CTU.

The variables Ctb Log 2SizeY, CtbSizeY, MinCb Log 2SizeY, MinCbSizeY, MinTb Log 2SizeY, MaxTb Log 2SizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows.

$$Ctb\ Log\ 2SizeY = \log 2\_ctu\_size\_minus2 + 2 \quad (7\text{-}5)$$

$$CtbSizeY = 1 << Ctb\ Log\ 2SizeY \quad (7\text{-}6)$$

$$MinCb\ Log\ 2SizeY = 2 \quad (7\text{-}7)$$

MinCbSizeY=1<<MinCb Log 2SizeY     (7-8)

MinTbSizeY=4     (7-9)

MaxTbSizeY=64     (7-10)

PicWidthInCtbsY=Ceil
 (pic_width_in_luma_samples÷CtbSizeY)     (7-11)

PicHeightInCtbsY=Ceil
 (pic_height_in_luma_samples÷CtbSizeY)     (7-12)

PicSizeInCtbsY=PicWidthInCtbsY*PicHeightInCtbsY     (7-13)

PicWidthInMinCbsY=pic_width_in_luma_samples/
 MinCbSizeY     (7-14)

PicHeightInMinCbsY=pic_height_in_luma_samples/
 MinCbSizeY     (7-15)

PicSizeInMinCbsY=PicWidthInMinCbsY*
 PicHeightInMinCbsY     (7-16)

PicSizeInSamplesY=pic_width_in_luma_samples*
 pic_height_in_luma_samples     (7-17)

PicWidthInSamplesC=pic_width_in_luma_samples/
 SubWidthC     (7-18)

PicHeightInSamplesC=pic_height_in_luma_samples/
 SubHeightC     (7-19)

log 2_min_qt_size_intra_slices_minus2 plus 2 specifies the minimum luma size of a leaf block resulting from quadtree splitting of a CTU in slices with slice_type equal to 2 (I). The value of log 2_min_qt_size_intra_slices_minus2 shall be in the range of 0 to Ctb Log 2SizeY−2, inclusive.

MinQt Log 2SizeIntraY=log 2_min_qt_size_in-
 tra_slices_minus2+2     (7-22)

[The leaf of a quadtree can either be a coding unit or the root of a nested multi-type tree.]

log 2_min_qt_size_inter_slices_minus2 plus 2 specifies the minimum luma size of a leaf block resulting from quadtree splitting of a CTU in slices with slice_type equal to 0 (B) or 1 (P). The value of log 2_min_qt_size_inter_slices_minus2 shall be in the range of 0 to Ctb Log 2SizeY−2, inclusive.

MinQt Log 2SizeInterY=log 2_
 min_qt_size_inter_slices_minus2+2     (7-23)

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 0 to Ctb Log 2SizeY−MinTb Log 2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices shall be in the range of 0 to Ctb Log 2SizeY−MinTb Log 2SizeY, inclusive.

Slice header semantics (according to Section 7.4.4 of the JVET-K1001-v4)

log 2_diff_ctu_max_bt_size specifies the difference between the luma CTB size and the maximum luma size (width or height) of a coding block that can be split using a binary split. The value of log 2_diff_ctu_max_bt_size shall be in the range of 0 to Ctb Log 2SizeY−MinCb Log 2SizeY, inclusive.

When log 2_diff_ctu_max_bt_size is not present, the value of log 2_diff_ctu_max_bt_size is inferred to be equal to 2.

The variables MinQt Log 2SizeY, MaxBt Log 2SizeY, MinBt Log 2SizeY, MaxTt Log 2SizeY, MinTt Log 2SizeY, MaxBtSizeY, MinBtSizeY, MaxTtSizeY, MinTtSizeY and MaxMttDepth are derived as follows.

MinQt Log 2SizeY=(slice_type==I)?MinQt Log
 2SizeIntraY:MinQt Log 2SizeInterY     (7-25)

MaxBt Log 2SizeY=Ctb Log 2SizeY−
 log 2_diff_ctu_max_bt_size     (7-26)

MinBt Log 2SizeY=MinCb Log 2SizeY     (7-27)

MaxTt Log 2SizeY=(slice_type==I)?5:6     (7-28)

MinTt Log 2SizeY=MinCb Log 2SizeY     (7-29)

MinQtSizeY=1<<MinQt Log 2SizeY     (7-30)

MaxBtSizeY=1<<MaxBt Log 2SizeY     (7-31)

MinBtSizeY=1<<MinBt Log 2SizeY     (7-32)

MaxTtSizeY=1<<MaxTt Log 2SizeY     (7-33)

MinTtSizeY=1<<MinTt Log 2SizeY     (7-34)

MaxMttDepth=(slice_type==I)?max_mtt_hierar-
 chy_depth_intra_slices:max_mtt_hierar-
 chy_depth_inter_slices     (7-35)

[In an example, the maximum TT size is fixed (32×32 luma samples and corresponding chroma samples for I-slices and 64×64 luma samples and corresponding chroma samples for P/B-slices) as well as the maximum BT size for I-slices (Ctb Log 2SizeY−2, e.g. 32×32 luma samples and corresponding chroma samples for a CTU size of 128×128 luma samples).]

Embodiment 1

According to a first embodiment, to multi-type tree enabled (disabled) flag, named exemplarily herein as btt_enabled_flag, can be signaled in the SPS (or in another parameter set such as PPS or the like, or in Slice header or in Tile header).

In particular, the btt_enabled_flag may take a first value indicating that the binary/ternary tree splitting is enabled and a second value indicating that the binary/ternary tree splitting is not enabled. The first value may be 1 and the second value may be 0 or vice versa. Binary flag provides for efficient coding. However, the disclosure is not limited thereto and in general, in tis disclosure, the flags may alternatively have more than one bits. According to an example:

If the btt_enabled_flag is true (meaning that the btt_enabled_flag has a first value such as 1), Bt (binary tree) and Tt (ternary) partitioning is enabled for the sequence (e.g. in case of SPS signaling), or picture (e.g. in case of PPS signaling), or slice (e.g. in case of slice header signaling) or tiles (e.g. in case of tile header signaling).

Otherwise (if the btt_enabled_flag is not true), Bt and Tt partitioning is disabled.

In a specific example, MinQtSizeY is set to 4 (currently in JVET-K1001-v4 MinCbSizeY is fixed as 4) or MinCbSize for both Intra and inter slices, to make sure the Qt split can reach the minimal allowed coding block. MaxMttDepth is set as 0 both for intra and inter slice to disable Bt and Tt.

MaxBtSizeY is set as 0 or MinCbSizeY to disable Bt. If MaxTtSizeY elements are signaled, the value of MaxTtSizeY is set as 0 or MinCbSizeY to disable Tt. If other values are fit of the range and can disable the corresponding partition operations, the values will also suit for the disclosure.

Technical advantage of the above-mentioned signaling includes the disclosure provides an alternative way to disable the partition high level constrains syntax element, combining with other embodiments, which provide more flexibility of the partition high level constraint(s).

Both encoder and decoding do the same (corresponding) operations. In other words, the encoders and the encoding methods generate the above discussed syntax while the decoders and decoding methods parse the syntax from the bitstream. Both encoding and decoding sides use the syntax to configure the partitioning for the coding units and to decode the coding units partitioned accordingly.

The corresponding syntax and semantics changes based on other approaches are exemplified below.

Modified sequence parameter set RBSP syntax (based on Section 7.3.2.1 of JVET-K1001-v4)

| [Preliminary basic SPS] | |
| --- | --- |
|  | Descriptor |
| seq_parameter_set_rbsp( ) { |  |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   qtbtt_dual_tree_intra_flag | ue(v) |
|   log2_ctu_size_minus2 | ue(v) |
|   btt_enabled_flag | ue(v) |
|   if (btt_enabled_flag) { |  |
|     log2_min_qt_size_intra_slices_minus2 | ue(v) |
|     log2_min_qt_size_inter_slices_minus2 | ue(v) |
|     max_mtt_hierarchy_depth_inter_slices | ue(v) |
|     max_mtt_hierarchy_depth_intra_slices | ue(v) |
|   } |  |
|   sps_cclm_enabled_flag | ue(1) |
|   sps_mts_intra_enabled_flag | ue(1) |
|   sps_mts_inter_enabled_flag | ue(1) |
|   rbsp_trailing_bits( ) |  |
| } |  |

Modified slice header syntax (based on Section 7.3.3 of JVET-K1001-v4)

| [Preliminary basic slice header] | |
| --- | --- |
|  | Descriptor |
| slice_header( ) { |  |
|   slice_pic_parameter_set_id | ue(v) |
|   slice_address | u(v) |
|   slice_type | ue(v) |
|   if( slice_type != I\|\| btt_enabled_flag ) |  |
|     log2_diff_ctu_max_bt_size | ~~ue(v)~~ |

| [Preliminary basic slice header] | |
| --- | --- |
|  | Descriptor |
|   dep_quant_enabled_flag | u(1) |
|   if( !dep_quant_enabled_flag ) |  |
|     sign_data_hiding_enabled_flag | u(1) |
|   byte_alignment( ) |  |
| } |  |

Modified sequence parameter set RBSP semantics (based on Section 7.4.3.1 of JVET-K1001-v4)

btt_enabled_flag equal to 1 specifies that the operation of multi-type tree partition is applied for slices referring to the SPS. btt_enabled_flag equal to 0 specifies that the operation of the multi-type tree partition is not applied for slices referring to the SPS.

log 2_min_qt_size_intra_slices_minus2 plus 2 specifies the minimum luma size of a leaf block resulting from quadtree splitting of a CTU in slices with slice_type equal to 2 (I). The value of log 2_min_qt_size_intra_slices_minus2 shall be in the range of 0 to Ctb Log 2SizeY−2, inclusive. When not present, the value of sps_log 2_min_qt_size_intra_slices_minus2 is inferred to be equal to 0.

$$\text{Min}Qt \text{ Log } 2\text{SizeIntra}Y = \log 2\_min\_qt\_size\_intra\_slices\_minus2 + 2 \qquad (7\text{-}22)$$

log 2_min_qt_size_inter_slices_minus2 plus 2 specifies the minimum luma size of a leaf block resulting from quadtree splitting of a CTU in slices with slice_type equal to 0 (B) or 1 (P). The value of log 2_min_qt_size_inter_slices_minus2 shall be in the range of 0 to Ctb Log 2SizeY−2, inclusive. When not present, the value of sps_log 2_min_qt_size_inter_slices_minus2 is inferred to be equal to 0.

$$\text{Min}Qt \text{ Log } 2\text{SizeInter}Y = \log 2\_min\_qt\_size\_inter\_slices\_minus2 + 2 \qquad (7\text{-}23)$$

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 0 to Ctb Log 2SizeY−MinTb Log 2SizeY, inclusive. When not present, the value of sps_max_mtt_hierarchy_depth_inter_slices is inferred to be equal to 0.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices shall be in the range of 0 to Ctb Log 2SizeY−MinTb Log 2SizeY, inclusive. When not present, the value of sps_max_mtt_hierarchy_depth_inter_slices is inferred to be equal to 0.

Modified slice header semantics (based on Section 7.4.4 of JVET-K1001-v4)

log 2_diff_ctu_max_bt_size specifies the difference between the luma CTB size and the maximum luma size (width or height) of a coding block that can be split using a binary split. The value of log 2_diff_ctu_max_bt_size shall be in the range of 0 to Ctb Log 2SizeY−MinCb Log 2SizeY, inclusive.

When log 2_diff_ctu_max_bt_size is not present,
If the btt_enabled_flag equal to 1
  the value of log 2_diff_ctu_max_bt_size is inferred to be equal to 2.
Otherwise
  the value of log 2_diff_ctu_max_bt_size is inferred to be equal to Ctb Log 2SizeY−MinCb Log 2SizeY.

The variables MinQt Log 2SizeY, MaxBt Log 2SizeY, MinBt Log 2SizeY, MaxTt Log 2SizeY, MinTt Log 2SizeY, MaxBtSizeY, MinBtSizeY, MaxTtSizeY, MinTtSizeY and MaxMttDepth are derived as follows.

$$\text{Min}Qt \text{ Log 2SizeY} = \log 2\_\min\_qt\_size\_minus2 + 2 \quad (7\text{-}25)$$

$$\text{Max}Bt \text{ Log 2SizeY} = Ctb \text{ Log 2SizeY} - \log 2\_\text{diff}\_ctu\_max\_bt\_size \quad (7\text{-}26)$$

$$\text{Min}Bt \text{ Log 2SizeY} = \text{Min}Cb \text{ Log 2SizeY} \quad (7\text{-}27)$$

$$\text{Max}Tt \text{ Log 2SizeY} = (\text{slice\_type}==I)?5:6 \quad (7\text{-}28)$$

$$\text{Min}Tt \text{ Log 2SizeY} = \text{Min}Cb \text{ Log 2SizeY} \quad (7\text{-}29)$$

$$\text{Min}Qt\text{Size}Y = 1 << \text{Min}Qt \text{ Log 2SizeY} \quad (7\text{-}30)$$

$$\text{Max}Bt\text{Size}Y = 1 << \text{Max}Bt \text{ Log 2SizeY} \quad (7\text{-}31)$$

$$\text{Min}Bt\text{Size}Y = 1 << \text{Min}Bt \text{ Log 2SizeY} \quad (7\text{-}32)$$

$$\text{Max}Tt\text{Size}Y = 1 << \text{Max}Tt \text{ Log 2SizeY} \quad (7\text{-}33)$$

$$\text{Min}Tt\text{Size}Y = 1 << \text{Min}Tt \text{ Log 2SizeY} \quad (7\text{-}34)$$

$$\text{Max}Mtt\text{Depth} = 1 << \max\_mtt\_\text{hierarchy\_depth} \quad (7\text{-}35)$$

Figure 13:
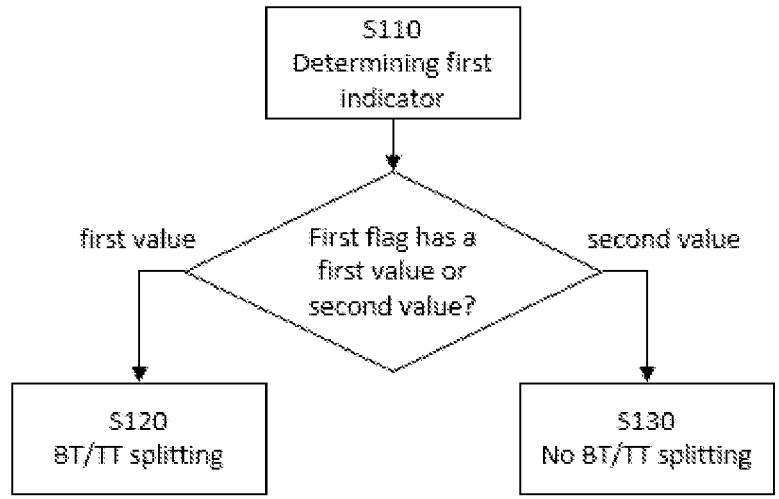
FIG. 13 is an exemplary flow diagram illustrating a method for image partitioning.

FIG. 13 shows an exemplary method for image partitioning. The method comprises a step of determining S110 a first indicator, wherein the first indicator is shared by a first part of a bitstream. The first indicator may be, for example, the above-mentioned btt_enabled_flag. The first part of the bitstream may correspond to the picture(s) for which the SPS signaling applies, in compliance with the above-presented example. However, it is noted that the first part of the bitstream may alternatively be one or more pictures for which the PPS signaling or any other signaling such as virtual parameter set (VPS) signaling applies. Alternatively, the first part of the bitstream may correspond to the bitstream of a slice, such that the first indicator is indicates in slice header or to the tile, and the signaling may be carried by the tile header.

The method further comprises a step of determining S120 a partitioning of an image area corresponding to the first part of the bitstream with binary tree (BT) splitting or ternary tree (TT) splitting, when the first indicator has a first value.

Finally, the method comprises a step of determining S130 the partitioning of the image area corresponding to the first part of the bitstream without BT splitting and TT splitting, when the first indicator has a second value, wherein the first value is different from the second value. The first and second value may be 1 or 0 respectively or vice versa. However, the particular value is immaterial for the present disclosure. Binary flag of a single bit which can only take two values represents an efficient signaling. However, the indication may be coded in any way and not necessarily by a one-bit indicator.

When the first indicator has the second value the method may further comprise a step of setting S140 of default values. The setting of default values S140 may further comprise setting the minimum luma size of a coding block from quadtree splitting (MinQtSizeY) as 4 or the minimum luma coding block size (MinCbSizeY), setting the maximum hierarchy depth from multiple type tree splitting (MaxMttDepth) as 0, and/or setting the maximum luma size of a coding block from BT splitting (MaxBtSizeY) as 0 or MinCbSizeY.

These values may provide the advantage of representing the extreme values. For example, MinQtSizeY of 4 is typically the smallest possible minimum allowable which typically corresponds to MinCbSizeY. MaxMttDepth of 0 corresponds to no partitioning. MaxBtSizeY set to 0 or MinCbSizeY means that there is no BT splitting possible.

The setting S140 of the default parameters may comprise, in addition or alternatively to the above-mentioned setting possibilities, setting the maximum luma size of a coding block from TT splitting (MaxTtSizeY) as 0 or as MinCbSizeY.

In step S110, the determining the first indicator comprises, for instance, deriving the first indicator by parsing the bitstream; or deriving a preset value of the first indicator.

In an exemplary implementation, the first indicator is included in a first side information set of the first part of the bitstream. As mentioned above, this can be, for instance a SPS, PPS, VPS or any other parameter set.

According to an exemplary implementation, any one or more or all of the following apply. For example, the first side information set is a sequence parameter set, when the first part is a sequence; or the first side information set is a picture parameter set, when the first part is a picture; or the first side information set is a slice header, when the first part is a slice; or the first side information set is a tile header, when the first part is a tile.

Figure 15:
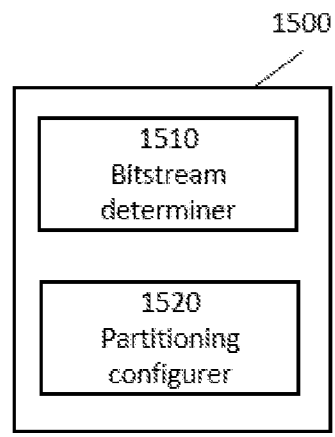
FIG. 15 is an exemplary apparatus for image partitioning.
Figure 16:
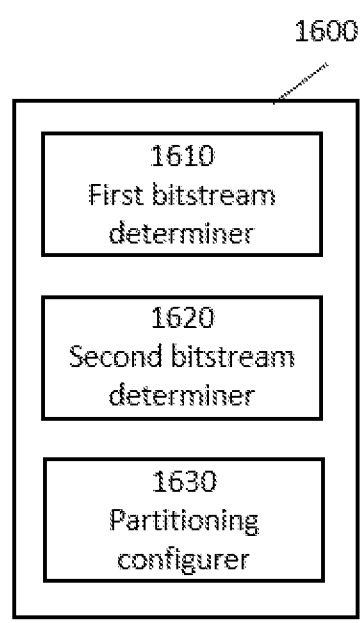
FIG. 16 is an exemplary apparatus for image partitioning.

Correspondingly, to the method, FIG. 15 shows an apparatus 1500 for image partitioning. The apparatus comprises a bitstream determining circuitry 1510 for determining a first indicator, wherein the first indicator is shared by a first part of a bitstream. Moreover, the apparatus a partitioning setting unit 1520 for determining a partitioning of an image area corresponding to the first part of the bitstream with binary tree, BT, splitting or ternary tree, TT, splitting, when the first indicator takes a first value; and for determining the partitioning of the image area corresponding to the first part of the bitstream without BT splitting and TT splitting, when the first indicator takes a second value, wherein the first value is different from the second value.

The partitioning setting unit 1520 may be further configured to, when the first indicator takes a second value, perform setting (S140) the minimum luma size of a coding block from quadtree splitting, MinQtSizeY, as 4 or the minimum luma coding block size, MinCbSizeY; setting (S140) the maximum hierarchy depth for multiple type tree splitting, MaxMttDepth, as 0; and/or setting (S140) the maximum luma size of a coding block from BT splitting, MaxBtSizeY, as 0 or MinCbSizeY.

Alternatively, or in addition, the partitioning setting unit 1520 may be further configured to perform setting (S140) the maximum luma size of a coding block from TT splitting, MaxTtSizeY, as 0 or MinCbSizeY (when the first indicator takes a second value) and/or to derive the MaxTtSizeY by parsing the bitstream.

In some embodiments, the bitstream determining circuitry 1510 may be configured for determining the first indicator comprises deriving the first indicator by parsing/before generating the bitstream; or deriving a preset value of the first indicator. The first indicator may be included in a first side information set of the first part of the bitstream. For example, the first side information set is a sequence parameter set, when the first part is a sequence; or the first side information set is a picture parameter set, when the first part is a picture; or the first side information set is a slice header, when the first part is a slice; or the first side information set is a tile header, when the first part is a tile. The "or" above is non-exclusive and thus corresponds to "and/or".

The settings may be performed in accordance with standard and/or by performing a rate-distortion optimization, by user setting, or in any other way.

Embodiment 2

According to an aspect 1 of the embodiment 2:

Partition high level syntax constraint elements can be signaled in SPS.

Partition high level syntax constraint elements can be overridden in Slice header.

BT and TT enabled (disabled) flag can be signaled in SPS and override in Slice header.

According to an aspect 2:

Partition high level syntax constraint elements can use default values.

According to an aspect 3:

BT and TT can be disabled in SPS.

BT and TT can be disabled in Slice header.

The aspect 1 can combined with either or both of aspect 2 and 3.

Techniques of the embodiment 2 may provide an advantage as follows (for example signaling in SPS, overriding in slice header). The high-level partition constraint(s) controls the tradeoff between partition complexity and the coding efficiency resulting from partitioning. The embodiment may facilitate the flexibility to control the tradeoff for an individual slice. For default values and Bt/Tt enabling (disabling) function, there is even more flexibility to control the elements.

As mentioned in embodiment 1, both encoder and decoding do the same (corresponding) operations.

The corresponding modifications based on syntax and semantics in other approaches are shown in the examples below Modified sequence parameter set RBSP syntax (based on Section 7.3.2.1 of JVET-K1001-v4)

| [Preliminary basic SPS] | |
| --- | --- |
|  | Descriptor |
| seq_parameter_set_rbsp( ) { |  |
|     sps_seq_parameter_set_id | ue(v) |
|     chroma_format_idc | ue(v) |
|     if( chroma_format_idc = = 3 ) |  |
|         separate_colour_plane_flag | u(1) |
|     pic_width_in_luma_samples | ue(v) |
|     pic_height_in_luma_samples | ue(v) |
|     bit_depth_luma_minus8 | ue(v) |
|     bit_depth_chroma_minus8 | ue(v) |
|     qtbtt_dual_tree_intra_flag | ue(v) |
|     log2_ctu_size_minus2 | ue(v) |
|     partition_constrains_control_present_flag | ue(v) |
|     if (partition_constrains_control_present_flag) { |  |
|         partition_constrains_override_enabled_flag | ue(v) |
|         sps_btt_enabled_flag | ue(v) |
|         if (sps_btt_enabled_flag) { |  |
|             sps_log2_min_qt_size_intra_slices_minus2 | ue(v) |
|             sps_log2_min_qt_size_inter_slices_minus2 | ue(v) |
|             sps_max_mtt_hierarchy_depth_inter_slices | ue(v) |

| [Preliminary basic SPS] | |
| --- | --- |
|  | Descriptor |
|             sps_max_mtt_hierarchy_depth_intra_slices | ue(v) |
|             sps_log2_diff_ctu_max_bt_size_intra_slices | ue(v) |
|             sps_log2_diff_ctu_max_bt_size_inter_slices | ue(v) |
|         } |  |
|     } |  |
|     sps_cclm_enabled_flag | ue(1) |
|     sps_mts_intra_enabled_flag | ue(1) |
|     sps_mts_inter_enabled_flag | ue(1) |
|     rbsp_trailing_bits( ) |  |
| } |  |

Modified slice header syntax (based on Section 7.3.3 of JVET-K1001-v4)

| [Preliminary basic slice header] | |
| --- | --- |
|  | Descriptor |
| slice_header( ) { |  |
|     slice_pic_parameter_set_id | ue(v) |
|     slice_address | u(v) |
|     slice_type | ue(v) |
|     if (partition_constrains_override_enabled_flag) { |  |
|         partition_constrains_override_flag | ue(v) |
|         if (partition_constrains_override_flag) { |  |
|             slice_btt_enabled_flag |  |
|             if (slice_btt_enabled_flag) { |  |
|                 log2_min_qt_size_minus2 | ue(v) |
|                 max_mtt_hierarchy_depth | ue(v) |
|                 log2_diff ctu_max_bt_size | ue(v) |
|             } |  |
|         } |  |
|     } |  |
|     dep_quant_enabled_flag | u(1) |
|     if( !dep_quant_enabled_flag ) |  |
|         sign_data_hiding_enabled_flag | u(1) |
|     byte_alignment( ) |  |
| } |  |

Modified sequence parameter set RBSP semantics (based on Section 7.4.3.1 of JVET-K1001-v4)

partition_constrains_control_present_flag equal to 1 specifies the presence of partition constrains control syntax elements in the SPS. partition_constrains_control_present_flag equal to 0 specifies the absence of partition constrains control syntax elements in the SPS.

sps_btt_enabled_flag equal to 1 specifies that the operation of the multi-type tree partition is applied for slices referring to the SPS in which slice_btt_enable_flag is not present. sps_btt_enabled_flag equal to 0 specifies that the operation of the multi-type tree partition is not applied for slices referring to the SPS in which slice_btt_enable_flag is not present. When not present, the value of sps_btt_enabled_flag is inferred to be equal to 1.

partition_constrains_override_enabled_flag equal to 1 specifies the presence of partition_constrains_override_flag in the slice headers for slices referring to the SPS. partition_constrains_override_enabled_flag equal to 0 specifies the absence of partition_constrains_override_flag in the slice headers for slices referring to the SPS. When not present, the value of partition_constrains_override_enabled_flag is inferred to be equal to 0.

sps_log 2_min_qt_size_intra_slices_minus2 plus 2 specifies the default minimum luma size of a leaf block resulting from quadtree splitting of a CTU in slices with slice_type equal to 2 (I) referring to the SPS, unless the default minimum luma sizes of a leaf block resulting from quadtree splitting of a CTU are overridden by the minimum luma sizes of a leaf block resulting from quadtree splitting of a CTU present in the slice header of the slices referring to the SPS. The value of log 2_min_qt_size_intra_slices_minus2 shall be in the range of 0 to Ctb Log 2SizeY−2, inclusive. When not present, the value of sps_log 2_min_qt_size_intra_slices_minus2 is inferred to be equal to 0.

sps_log 2_min_qt_size_inter_slices_minus2 plus 2 specifies the default minimum luma size of a leaf block resulting from quadtree splitting of a CTU in slices with slice_type equal to 0 (B) or 1 (P) referring to the SPS, unless the default minimum luma sizes of a leaf block resulting from quadtree splitting of a CTU are overridden by the minimum luma sizes of a leaf block resulting from quadtree splitting of a CTU present in the slice header of the slices referring to the SPS. The value of log 2_min_qt_size_inter_slices_minus2 shall be in the range of 0 to Ctb Log 2SizeY−2, inclusive. When not present, the value of sps_log 2_min_qt_size_inter_slices_minus2 is inferred to be equal to 0.

sps_max_mtt_hierarchy_depth_inter_slices specifies the default maximum hierarchy depth for coding units resulting from multi-type tree splitting of a quadtree leaf in slices with slice_type equal to 0 (B) or 1 (P) referring to the SPS, unless the default maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_inter_slices shall be in the range of 0 to Ctb Log 2SizeY−MinTb Log 2SizeY, inclusive. When not present, if the sps_btt_enabled_flag is equal to 1 the value of sps_max_mtt_hierarchy_depth_inter_slices is inferred to be equal to 3. Otherwise, the value of sps_max_mtt_hierarchy_depth_inter_slices is inferred to be equal to 0.

sps_max_mtt_hierarchy_depth_intra_slices specifies the default maximum hierarchy depth for coding units resulting from multi-type tree splitting of a quadtree leaf in slices with slice_type equal to 2 (I) referring to the SPS, unless the default maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_intra_slices shall be in the range of 0 to Ctb Log 2SizeY−MinTb Log 2SizeY, inclusive. When not present, if the sps_btt_enabled_flag is equal to 1, and the value of sps_max_mtt_hierarchy_depth_intra_slices is inferred to be equal to 3. Otherwise, the value of sps_max_mtt_hierarchy_depth_intra_slices is inferred to be equal to 0.

sps_log 2_diff_ctu_max_bt_size_intra_slices specifies the default difference between the luma CTB size and the maximum luma size (width or height) of a coding block that can be split using a binary split in slices with slice_type equal to 2 (I) referring to the SPS, unless the default differences between the luma CTB size and the maximum luma size (width or height) of a coding block that can be split using a binary split are overridden by the differences between the luma CTB size and the maximum luma size (width or height) of a coding block that can be split using a binary split present in the slice header of the slices referring to the SPS. The value of log 2_diff_ctu_max_bt_size shall be in the range of 0 to Ctb Log 2SizeY−MinCb Log 2SizeY, inclusive. When not present, if the sps_btt_enabled_flag is equal to 1, the value of sps_log 2_diff_ctu_max_bt_size_intra slices is inferred to be equal to 2. Otherwise, the value of sps_log 2_diff_ctu_max_bt_size_intra_slices is inferred to be equal to Ctb Log 2SizeY−MinCb Log 2SizeY.

sps_log 2_diff_ctu_max_bt_size_inter_slices specifies the default difference between the luma CTB size and the maximum luma size (width or height) of a coding block that can be split using a binary split in slices with slice_type equal to 0 (B) or 1 (P) referring to the SPS, unless the default differences between the luma CTB size and the maximum luma size (width or height) of a coding block that can be split using a binary split are overridden by the differences between the luma CTB size and the maximum luma size (width or height) of a coding block that can be split using a binary split present in the slice header of the slices referring to the SPS. The value of log 2_diff_ctu_max_bt_size shall be in the range of 0 to Ctb Log 2SizeY−MinCb Log 2SizeY, inclusive. When not present, if the sps_btt_enabled_flag is equal to 1, the value of sps_log 2_diff_ctu_max_bt_size_inter_slices is inferred to be equal to 0. Otherwise, the value of sps_log 2_diff_ctu_max_bt_size_inter_slices is inferred to be equal to Ctb Log 2SizeY−MinCb Log 2SizeY.

Modified slice header semantics (based on Section 7.4.4 of JVET-K1001-v4)

partition_constrains_override_flag equal to 1 specifies that partition constrains parameters are present in the slice header. partition_constrains_override_flag equal to 0 specifies that deblocking parameters are not present in the slice header. When not present, the value of partition_constrains_override_flag is inferred to be equal to 0.

slice_btt_enabled_flag equal to 1 specifies that the operation of the multi-type tree partition is applied for the current slice. slice_btt_enabled_flag equal to 0 specifies that the operation of the multi-type tree partition is not applied for the current slice. When slice_btt_enabled_flag is not present, it is inferred to be equal to sps_btt_enabled_flag.

log 2_min_qt_size_minus2 plus 2 specifies the minimum luma size of a leaf block resulting from quadtree splitting of a CTU fur the current slice. The value of log 2_min_qt_size_inter_slices_minus2 shall be in the range of 0 to Ctb Log 2SizeY−2, inclusive. When not present, the values of log 2_min_qt_size_minus2 is inferred to be equal to sps_log 2_min_qt_size_intra_slices_minus2 with slice_type equal to 2 (I) and inferred to be equal to sps_log 2_min_qt_size_inter_slices_minus2 with slice_type equal to 0 (B) or 1 (P).

max_mtt_hierarchy_depth specifies the maximum hierarchy depth for coding units resulting from multi-type tree splitting of a quadtree leaf for the current slice. The value of max_mtt_hierarchy_depth_intra_slices shall be in the range of 0 to Ctb Log 2SizeY−MinTb Log 2SizeY, inclusive. When not present, the values of log 2_min_qt_size_minus2 is inferred to be equal to sps_max_mtt_hierarchy_depth_intra_slices with slice_type equal to 2 (I) and inferred to be equal to sps_max_mtt_hierarchy_depth_inter_slices with slice_type equal to 0 (B) or 1 (P).

log 2_diff_ctu_max_bt_size specifies the difference between the luma CTB size and the maximum luma size (width or height) of a coding block that can be split using a binary split for the current slice. The value of log 2_diff_ctu_max_bt_size shall be in the range of 0 to Ctb Log 2SizeY−MinCb Log 2SizeY, inclusive. When not present, the values of log 2_min_qt_size_minus2 is inferred to be equal to sps_log 2_diff_ctu_max_bt_size_intra_slices with slice_type equal to 2 (I) and inferred to be equal to sps_log 2_diff_ctu_max_bt_size_inter_slices with slice_type equal to 0 (B) or 1 (P).

The variables MinQt Log 2SizeY, MaxBt Log 2SizeY, MinBt Log 2SizeY, MaxTt Log 2SizeY, MinTt Log 2SizeY, MaxBtSizeY, MinBtSizeY, MaxTtSizeY, MinTtSizeY and MaxMttDepth are derived as follows:

$$\text{Min}Qt \text{ Log 2Size}Y = \log 2\_\min\_qt\_size\_\minus2+2 \quad (7\text{-}25)$$

$$\text{Max}Bt \text{ Log 2Size}Y = Ctb \text{ Log 2Size}Y - \log 2\_\text{diff}\_ctu\_\max\_bt\_size \quad (7\text{-}26)$$

$$\text{Min}Bt \text{ Log 2Size}Y = \text{Min}Cb \text{ Log 2Size}Y \quad (7\text{-}27)$$

$$\text{Max}Tt \text{ Log 2Size}Y = (\text{slice\_type} == I)?5:6 \quad (7\text{-}28)$$

$$\text{Min}Tt \text{ Log 2Size}Y = \text{Min}Cb \text{ Log 2Size}Y \quad (7\text{-}29)$$

$$\text{Min}Qt\text{Size}Y = 1 << \text{Min}Qt \text{ Log 2Size}Y \quad (7\text{-}30)$$

$$\text{Max}Bt\text{Size}Y = 1 << \text{Max}Bt \text{ Log 2Size}Y \quad (7\text{-}31)$$

$$\text{Min}Bt\text{Size}Y = 1 << \text{Min}Bt \text{ Log 2Size}Y \quad (7\text{-}32)$$

$$\text{Max}Tt\text{Size}Y = 1 << \text{Max}Tt \text{ Log 2Size}Y \quad (7\text{-}33)$$

$$\text{Min}Tt\text{Size}Y = 1 << \text{Min}Tt \text{ Log 2Size}Y \quad (7\text{-}34)$$

$$\text{Max}Mtt\text{Depth} = 1 << \max\_mtt\_\text{hierarchy\_depth} \quad (7\text{-}35)$$

Figure 14:
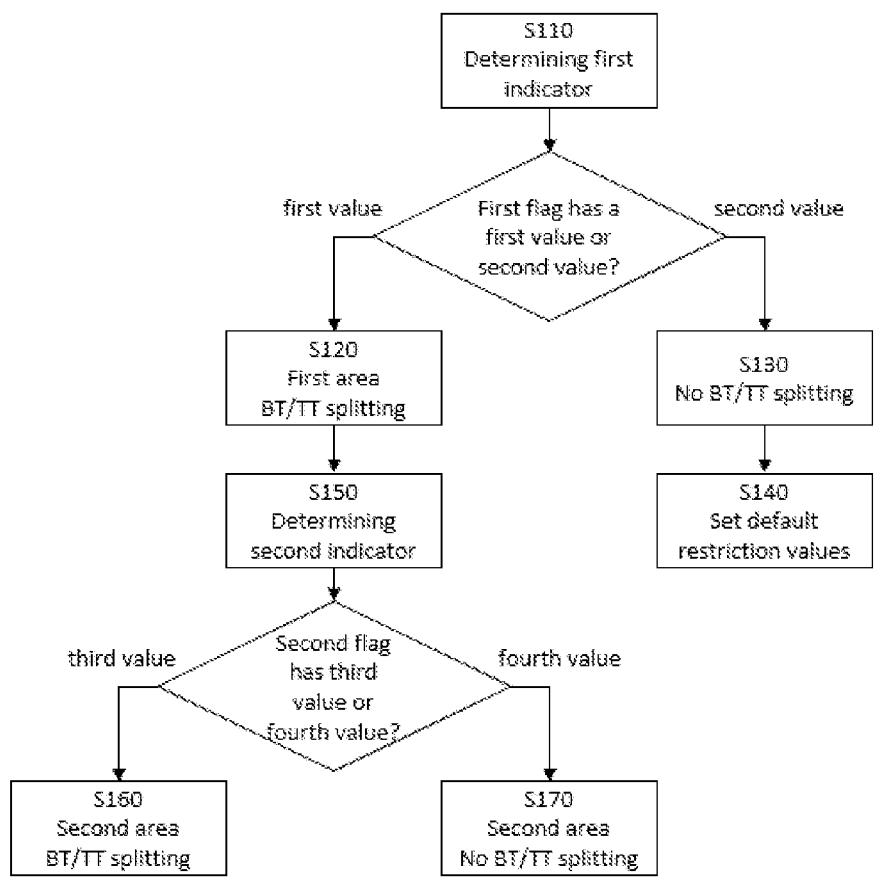
FIG. 14 is an exemplary flow diagram illustrating a method for image partitioning.

FIG. 14 shows an exemplary method in compliance with this embodiment. In this embodiment, alternatively, or in addition to the embodiment 1 (shown in FIG. 14), when the first part is a sequence and the first indicator is the first value, the method further comprises the steps of determining S150 a second indicator, wherein the second indicator is shared by a second part of the bitstream; determining S160 a partition of image area corresponding to the second part of the bitstream with BT splitting or TT splitting, when the second indicator is a third value; and determining S170 the partition of image area corresponding to the second part of the bitstream without BT splitting and TT splitting, when the second indicator is a fourth value, wherein the third value is different from the fourth value.

The second part may be a picture, a slice or a tile. The step of determining S150 of the second indicator in some embodiments comprises deriving the second indicator by parsing/before generating the bitstream; or deriving a preset value of the second indicator.

Shows an exemplary apparatus 1600 in compliance with this embodiment. In this embodiment, alternatively, or in addition to the embodiment 1 (shown in FIG. 15), when the first part is a sequence and the first indicator is the first value, the apparatus further comprises, in addition to the first bitstream determiner 1610 corresponding to the bitstream determiner 1510, a second bitstream determiner 1620 for determining a second indicator, wherein the second indicator is shared by a second part of the bitstream. Moreover, the partitioning configure 1630 (which may also embody the partitioning configure 1520) is configured for determining a partition of image area corresponding to the second part of the bitstream with BT splitting or TT splitting, when the second indicator is a third value; and determining the partition of image area corresponding to the second part of the bitstream without BT splitting and TT splitting, when the second indicator is a fourth value, wherein the third value is different from the fourth value.

According to an exemplary implementation, the second indicator is included in a second side information set of the second part of the bitstream, wherein the second part of the bitstream is a part of the first part of the bitstream. As mentioned above, the first part may be an SPS while the second part is a slice header. However, the disclosure is not limited to such embodiments, and any of the above-mentioned alternatives and their combinations for the first and the second area apply.

In particular, in some embodiments, the first part is a sequence, wherein the second side information set is a picture parameter set, when the second part is a picture; or, the second side information set is a slice header, when the second part is a slice; or, the second side information set is a tile header, when the second part is a tile.

Alternatively, the first part is a picture, wherein the second side information set is a slice header, when the second part is a slice; or, the second side information set is a tile header, when the second part is a tile.

MaxTtSizeY can be derived by parsing the bitstream.

Embodiment 3

If the MaxTTSizeY (maximum luma size (width or height) of a coding block that can be split using a ternary splitting) is signaled in SPS (or other parameter set or Slice header). In particular, MaxTTSizeY may be signaled in the SPS by means of an exemplary syntax element sps_log 2_diff_ctu_max_tt_size_intra_slices and/or sps_log 2_diff_ctu_max_tt_size_inter_slices for the intra and inter slices (or tiles, or in general for coding units having intra or inter prediction modes), respectively. Moreover, an override enable flag (e.g. partition_constrains_override_enabled_flag) may be signaled in the SPS. The flag may indicate whether or not restriction parameters signaled at lower level (such as slice header) may override the restriction parameters signaled on the SPS level. For example, a restriction parameter may be MaxTTSizeY. Correspondingly, the slice header may then include, in case the override enable flag is set to indicate allowed overriding, another flag (e.g. a partition_constrains_override_flag) indicating whether or not restriction parameters are present in the slice header and override the restriction parameters signaled in the SPS. In case the other flag (e.g. the partition_constrains_override_flag) is set to indicate that overriding takes place, the MaxTTSizeY (and/or other partitioning restriction parameters) is signaled, e.g. as log 2_diff_ctu_max_tt_size (and/or e.g. log 2_diff_ctu_max_bt_size, log 2_min_qt_size_minus2, or max_mtt_hierarchy_depth or the like).

The Embodiments 1 and/or 2 or any of aspect 1 or aspect 2 could be applied in the same manner.

This technique may provide the following advantage. The embodiment signaling the indicator of MaxTtSizeY syntax elements make sure that there is more flexibility the control the syntax elements.

Both encoder and decoding do the same (corresponding) operations

The syntax changes shown below in an exemplary syntax are based on Embodiment 1. However, the syntax could also be based on Embodiment 2 or any aspect 2 and/or aspect 3.

Modified sequence parameter set RBSP syntax (based on Section 7.3.2.1 of JVET-K1001-v4)

| | Descriptor |
|---|---|
| seq_parameter_set_rbsp( ) { | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   qtbtt_dual_tree_intra_flag | ue(v) |
|   log2_ctu_size_minus2 | ue(v) |
|   partition_constrains_override_enabled_flag | ue(v) |
|   sps_log2_min_qt_size_intra_slices_minus2 | ue(v) |
|   sps_log2_min_qt_size_inter_slices_minus2 | ue(v) |
|   sps_max_mtt_hierarchy_depth_inter_slices | ue(v) |
|   sps_max_mtt_hierarchy_depth_intra_slices | ue(v) |
|   sps_log2_diff_ctu_max_bt_size_intra_slices | ue(v) |
|   sps_log2_diff_ctu_max_bt_size_inter_slices | ue(v) |
|   sps_log2_diff_ctu_max_tt_size_intra_slices | ue(v) |
|   sps_log2_diff_ctu_max_tt_size_inter_slices | ue(v) |
|   sps_cclm_enabled_flag | ue(1) |
|   sps_mts_intra_enabled_flag | ue(1) |
|   sps_mts_inter_enabled_flag | ue(1) |
|   rbsp_trailing_bits( ) | |
| } | |

Modified slice header syntax (based on Section 7.3.3 of JVET-K1001-v4)

| [Preliminary basic slice header] | |
|---|---|
| | Descriptor |
| slice_header( ) { | |
|   slice_pic_parameter_set_id | ue(v) |
|   slice_address | u(v) |
|   slice_type | ue(v) |
|   if (partition_constrains_override_enabled_flag) { | |
|     partition_constrains_override_flag | ue(v) |
|     if (partition_constrains_override_flag) { | |
|       log2_min_qt_size_minus2 | ue(v) |
|       max_mtt_hierarchy_depth | ue(v) |
|       log2_diff_ctu_max_bt_size | ue(v) |
|       log2_diff_ctu_max_tt_size | |
|     } | |
|   } | |
|   dep_quant_enabled_flag | u(1) |
|   if( !dep_quant_enabled_flag ) | |
|     sign_data_hiding_enabled_flag | u(1) |
|   byte_alignment( ) | |
| } | |

Embodiment 4

According to this embodiment, the btt_enabled_flag (cf. of embodiment 2) is separated as bt_enabled_flag and tt_enabled_flag to enable or disable bt and tt splitting separately.

This technique may provide the following advantage. Signaling of the BT enabling flag and TT enabling flag separately provides more flexibility to control the partition constrain syntax elements.

Both encoder and decoding do the same (corresponding) operations.

The syntax and semantic changes exemplified in the following are based on embodiment 2.

Modified sequence parameter set RBSP syntax (based on Section 7.3.2.1 of JVET-K1001-v4)

| [Preliminary basic SPS] | |
|---|---|
| | Descriptor |
| seq_parameter_set_rbsp( ) { | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   qtbtt_dual_tree_intra_flag | ue(v) |
|   log2_ctu_size_minus2 | ue(v) |
|   partition_constrains_control_present_flag | ue(v) |
|   if (partition_constrains_control_present_flag) { | |
|     partition_constrains_override_enabled_flag | ue(v) |
|     sps_bt_enabled_flag | ue(v) |
|     sps_tt_enabled_flag | |
|     if (sps_bt_enabled_flag ‖ sps_tt_enabled_flag) { | |
|       sps_log2_min_qt_size_intra_slices_minus2 | ue(v) |
|       sps_log2_min_qt_size_inter_slices_minus2 | ue(v) |
|       sps_max_mtt_hierarchy_depth_inter_slices | ue(v) |
|       sps_max_mtt_hierarchy_depth_intra_slices | ue(v) |
|     } | |
|     if (sps_bt_enabled_flag){ | |
|       sps_log2_diff_ctu_max_bt_size_intra_slices | ue(v) |
|       sps_log2_diff_ctu_max_bt_size_inter_slices | ue(v) |
|     } | |
|     if (sps_tt_enabled_flag){ | |
|       sps_log2_diff_ctu_max_tt_size_inter_slices | |
|       sps_log2_diff_ctu_max_tt_size_intra_slices | |
|     } | |
|   } | |
|   sps_cclm_enabled_flag | ue(1) |
|   sps_mts_intra_enabled_flag | ue(1) |
|   sps_mts_inter_enabled_flag | ue(1) |
|   rbsp_trailing_bits( ) | |
| } | |

Modified slice header syntax (based on Section 7.3.3 of JVET-K1001-v4)

| [Preliminary basic slice header] | |
|---|---|
| | Descriptor |
| slice_header( ) { | |
|   slice_pic_parameter_set_id | ue(v) |
|   slice_address | u(v) |
|   slice_type | ue(v) |
|   if (partition_constrains_override_enabled_flag) { | |
|     partition_constrains_override_flag | ue(v) |
|     if (partition_constrains_override_flag) { | |
|       slice_bt_enabled_flag | |
|       slice_tt_enabled_flag | |
|       if (slice_bt_enalbed_flag ‖ slice_tt_enabled_flag) { | |
|         log2_min_qt_size_minus2 | ue(v) |
|         max_mtt_hierarchy_depth | ue(v) |
|       } | |
|       if (slice_bt_enabled_flag) | |
|         log2_diff_ctu_max_bt_size | ue(v) |
|       if (slice_tt_enabled_flag) | |
|         log2_diff_ctu_max_tt_size | |
|     } | |
|   } | |
|   dep_quant_enabled_flag | u(1) |
|   if( !dep_quant_enabled_flag ) | |
|     sign_data_hiding_enabled_flag | u(1) |
|   byte_alignment( ) | |
| } | |

Modified Sequence parameter set RBSP semantics (based on Section 7.4.3.1 of JVET-K1001-v4)

partition_constrains_control_present_flag equal to 1 specifies the presence of partition constrains control syntax elements in the SPS. partition_constrains_control_present_flag equal to 0 specifies the absence of partition constrains control syntax elements in the SPS.

sps_bt_enabled_flag equal to 1 specifies that the operation of the binary tree partition is applied for slices referring to the SPS in which slice_bt_enable_flag is not present. sps_bt_enabled_flag equal to 0 specifies that the operation of the binary tree partition is not applied for slices referring to the SPS in which slice_bt_enable_flag is not present. When not present, the value of sps_bt_enabled_flag is inferred to be equal to 1.

sps_tt_enabled_flag equal to 1 specifies that the operation of the ternary tree partition is applied for slices referring to the SPS in which slice_tt_enable_flag is not present. sps_tt_enabled_flag equal to 0 specifies that the operation of the ternary tree partition is not applied for slices referring to the SPS in which slice_tt_enable_flag is not present. When not present, the value of sps_tt_enabled_flag is inferred to be equal to 1.

partition_constrains_override_enabled_flag equal to 1 specifies the presence of partition_constrains_override_flag in the slice headers for slices referring to the SPS. partition_constrains_override_enabled_flag equal to 0 specifies the absence of partition_constrains_override_flag in the slice headers for slices referring to the SPS. When not present, the value of partition_constrains_override_enabled_flag is inferred to be equal to 0.

sps_log 2_min_qt_size_intra_slices_minus2 plus 2 specifies the default minimum luma size of a leaf block resulting from quadtree splitting of a CTU in slices with slice_type equal to 2 (I) referring to the SPS, unless the default minimum luma sizes of a leaf block resulting from quadtree splitting of a CTU are overridden by the minimum luma sizes of a leaf block resulting from quadtree splitting of a CTU present in the slice header of the slices referring to the SPS. The value of log 2_min_qt_size_intra_slices_minus2 shall be in the range of 0 to Ctb Log 2SizeY−2, inclusive. When not present, the value of sps_log 2_min_qt_size_intra_slices_minus2 is inferred to be equal to 0.

sps_log 2_min_qt_size_inter_slices_minus2 plus 2 specifies the default minimum luma size of a leaf block resulting from quadtree splitting of a CTU in slices with slice_type equal to 0 (B) or 1 (P) referring to the SPS, unless the default minimum luma sizes of a leaf block resulting from quadtree splitting of a CTU are overridden by the minimum luma sizes of a leaf block resulting from quadtree splitting of a CTU present in the slice header of the slices referring to the SPS. The value of log 2_min_qt_size_inter_slices_minus2 shall be in the range of 0 to Ctb Log 2SizeY−2, inclusive. When not present, the value of sps_log 2_min_qt_size_inter_slices_minus2 is inferred to be equal to 0.

sps_max_mtt_hierarchy_depth_inter_slices specifies the default maximum hierarchy depth for coding units resulting from multi-type tree splitting of a quadtree leaf in slices with slice_type equal to 0 (B) or 1 (P) referring to the SPS, unless the default maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_inter_slices shall be in the range of 0 to Ctb Log 2SizeY−MinTb Log 2SizeY, inclusive. When not present,
    if the sps_bt_enabled_flag is equal to 1 or sps_tt_enabled_flag is equal to 1
    the value of sps_max_mtt_hierarchy_depth_inter_slices is inferred to be equal to 3.
    Otherwise, the value of sps_max_mtt_hierarchy_depth_inter_slices is inferred to be equal to 0.

sps_max_mtt_hierarchy_depth_intra_slices specifies the default maximum hierarchy depth for coding units resulting from multi-type tree splitting of a quadtree leaf in slices with slice_type equal to 2 (I) referring to the SPS, unless the default maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_intra_slices shall be in the range of 0 to Ctb Log 2SizeY−MinTb Log 2SizeY, inclusive. When not present,
    if the sps_btt_enabled_flag is equal to 1 sps_tt_enabled_flag is equal to 1
    the value of sps_max_mtt_hierarchy_depth_intra_slices is inferred to be equal to 3.
    Otherwise, the value of sps_max_mtt_hierarchy_depth_intra_slices is inferred to be equal to 0.

sps_log 2_diff_ctu_max_bt_size_intra_slices specifies the default difference between the luma CTB size and the maximum luma size (width or height) of a coding block that can be split using a binary split in slices with slice_type equal to 2 (I) referring to the SPS, unless the default differences between the luma CTB size and the maximum luma size (width or height) of a coding block that can be split using a binary split are overridden by the differences between the luma CTB size and the maximum luma size (width or height) of a coding block that can be split using a binary split present in the slice header of the slices referring to the SPS. The value of log 2_diff_ctu_max_bt_size shall be in the range of 0 to Ctb Log 2SizeY−MinCb Log 2SizeY, inclusive. When not present,
    if the sps_bt_enabled_flag is equal to 1
    the value of sps_log 2_diff_ctu_max_bt_size_intra_slices is inferred to be equal to 2.
    Otherwise, the value of sps_log 2_diff_ctu_max_bt_size_intra_slices is inferred to be equal to Ctb Log 2SizeY−MinCb Log 2SizeY.

sps_log 2_diff_ctu_max_bt_size_inter_slices specifies the default difference between the luma CTB size and the maximum luma size (width or height) of a coding block that can be split using a binary split in slices with slice_type equal to 0 (B) or 1 (P) referring to the SPS, unless the default differences between the luma CTB size and the maximum luma size (width or height) of a coding block that can be split using a binary split are overridden by the differences between the luma CTB size and the maximum luma size (width or height) of a coding block that can be split using a binary split present in the slice header of the slices referring to the SPS. The value of log 2_diff_ctu_max_bt_size shall be in the range of 0 to Ctb Log 2SizeY−MinCb Log 2SizeY, inclusive. When not present,
    if the sps_bt_enabled_flag is equal to 1
    the value of sps_log 2_diff_ctu_max_bt_size_inter_slices is inferred to be equal to 0.
    Otherwise, the value of sps_log 2_diff_ctu_max_bt_size_inter_slices is inferred to be equal to Ctb Log 2SizeY−MinCb Log 2SizeY.

sps_log 2_diff_ctu_max_tt_size_intra_slices specifies the default difference between the luma CTB size and the maximum luma size (width or height) of a coding block that can be split using a ternary split in slices with slice_type equal to 2 (I) referring to the SPS, unless the default differences between the luma CTB size and the maximum luma size (width or height) of a coding block that can be split using a ternary split are overridden by the differences between the luma CTB size and the maximum luma size (width or height) of a coding block that can be split using a ternary split present in the slice header of the slices referring to the SPS. The value of sps_log 2_diff_ctu_max_tt_size shall be in the range of 0 to Ctb Log 2SizeY−MinCb Log 2SizeY, inclusive. When not present, if the sps_tt_enabled_flag is equal to 1
the value of sps_log 2_diff_ctu_max_tt_size_intra_slices is inferred to be equal to 2.
Otherwise, the value of sps_log 2_diff_ctu_max_tt_size_intra_slices is inferred to be equal to Ctb Log 2SizeY−MinCb Log 2SizeY.

sps_log 2_diff_ctu_max_tt_size_inter_slices specifies the default difference between the luma CTB size and the maximum luma size (width or height) of a coding block that can be split using a ternary split in slices with slice_type equal to 0 (B) or 1 (P) referring to the SPS, unless the default differences between the luma CTB size and the maximum luma size (width or height) of a coding block that can be split using a ternary split are overridden by the differences between the luma CTB size and the maximum luma size (width or height) of a coding block that can be split using a ternary split present in the slice header of the slices referring to the SPS. The value of log 2_diff_ctu_max_tt_size shall be in the range of 0 to Ctb Log 2SizeY−MinCb Log 2SizeY, inclusive. When not present, if the sps_tt_enabled_flag is equal to 1
the value of sps_log 2_diff_ctu_max_tt_size_inter_slices is inferred to be equal to 1.
Otherwise, the value of sps_log 2_diff_ctu_max_tt_size_inter_slices is inferred to be equal to Ctb Log 2SizeY−MinCb Log 2SizeY.

Modified slice header semantics (based on Section 7.4.4 of JVET-K1001-v4)

partition_constrains_override_flag equal to 1 specifies that partition constrains parameters are present in the slice header. partition_constrains_override_flag equal to 0 specifies that deblocking parameters are not present in the slice header. When not present, the value of deblocking_filter_override_flag is inferred to be equal to 0.

slice_btt_enabled_flag equal to 1 specifies that the operation of the multi-type tree partition is not applied for the current slice. slice_btt_enabled_flag equal to 0 specifies that the operation of the multi-type tree partition is applied for the current slice. When slice_deblocking_filter_disabled_flag is not present, it is inferred to be equal to sps_btt_enabled_flag.

log 2_min_qt_size_minus2 plus 2 specifies the minimum luma size of a leaf block resulting from quadtree splitting of a CTU fur the current slice. The value of log 2_min_qt_size_inter_slices_minus2 shall be in the range of 0 to Ctb Log 2SizeY−2, inclusive. When not present, the values of log 2_min_qt_size_minus2 is inferred to be equal to sps_log 2_min_qt_size_intra_slices_minus2 with slice_type equal to 2 (I) and inferred to be equal to sps_log 2_min_qt_size_inter_slices_minus2 with slice_type equal to 0 (B) or 1 (P).

max_mtt_hierarchy_depth specifies the maximum hierarchy depth for coding units resulting from multi-type tree splitting of a quadtree leaf for the current slice. The value of max_mtt_hierarchy_depth_intra_slices shall be in the range of 0 to Ctb Log 2SizeY−MinTb Log 2SizeY, inclusive. When not present, the values of log 2_min_qt_size_minus2 is inferred to be equal to sps_max_mtt_hierarchy_depth_intra_slices with slice_type equal to 2 (I) and inferred to be equal to sps_max_mtt_hierarchy_depth_inter_slices with slice_type equal to 0 (B) or 1 (P).

log 2_diff_ctu_max_bt_size specifies the difference between the luma CTB size and the maximum luma size (width or height) of a coding block that can be split using a binary split for the current slice. The value of log 2_diff_ctu_max_bt_size shall be in the range of 0 to Ctb Log 2SizeY−MinCb Log 2SizeY, inclusive. When not present, the values of log 2_min_qt_size_minus2 is inferred to be equal to sps_log 2_diff_ctu_max_bt_size_intra_slices with slice_type equal to 2 (I) and inferred to be equal to sps_log 2_diff_ctu_max_bt_size_inter_slices with slice_type equal to 0 (B) or 1 (P).

log 2_diff_ctu_max_tt_size specifies the difference between the luma CTB size and the maximum luma size (width or height) of a coding block that can be split using a binary split for the current slice. The value of log 2_diff_ctu_max_tt_size shall be in the range of 0 to Ctb Log 2SizeY−MinCb Log 2SizeY, inclusive. When not present, the values of log 2_min_qt_size_minus2 is inferred to be equal to sps_log 2_diff_ctu_max_tt_size_intra_slices with slice_type equal to 2 (I) and inferred to be equal to sps_log 2_diff_ctu_max_tt_size_inter_slices with slice_type equal to 0 (B) or 1 (P).

The variables MinQt Log 2SizeY, MaxBt Log 2SizeY, MinBt Log 2SizeY, MaxTt Log 2SizeY, MinTt Log 2SizeY, MaxBtSizeY, MinBtSizeY, MaxTtSizeY, MinTtSizeY and MaxMttDepth are derived as follows:

$$\text{Min}Qt \text{ Log 2Size}Y = \log 2\_min\_qt\_size\_minus2 + 2 \quad (7\text{-}25)$$

$$\text{Max}Bt \text{ Log 2Size}Y = Ctb \text{ Log 2Size}Y - \log 2\_diff\_ctu\_max\_bt\_size \quad (7\text{-}26)$$

$$\text{Min}Bt \text{ Log 2Size}Y = \text{Min}Cb \text{ Log 2Size}Y \quad (7\text{-}27)$$

$$\text{Max}Tt \text{ Log 2Size}Y = Ctb \text{ Log 2Size}Y - \log 2\_diff\_ctu\_tt\_size \quad (7\text{-}28)$$

$$\text{Min}Tt \text{ Log 2Size}Y = \text{Min}Cb \text{ Log 2Size}Y \quad (7\text{-}29)$$

$$\text{Min}Qt\text{Size}Y = 1 << \text{Min}Qt \text{ Log 2Size}Y \quad (7\text{-}30)$$

$$\text{Max}Bt\text{Size}Y = 1 << \text{Max}Bt \text{ Log 2Size}Y \quad (7\text{-}31)$$

$$\text{Min}Bt\text{Size}Y = 1 << \text{Min}Bt \text{ Log 2Size}Y \quad (7\text{-}32)$$

$$\text{Max}Tt\text{Size}Y = 1 << \text{Max}Tt \text{ Log 2Size}Y \quad (7\text{-}33)$$

$$\text{Min}Tt\text{Size}Y = 1 << \text{Min}Tt \text{ Log 2Size}Y \quad (7\text{-}34)$$

$$\text{Max}Mtt\text{Depth} = 1 << max\_mtt\_hierarchy\_depth \quad (7\text{-}35)$$

An exemplary method is provided in this embodiment, wherein the first indicator includes a first BT indicator and a first TT indicator and the method comprises the steps of determining the partition of image area corresponding to the first part of the bitstream with BT splitting, when the first BT indicator is a fifth value; and determining the partition of image area corresponding to the first part of the bitstream without BT splitting, when the first BT indicator is a sixth value, wherein the fifth value is different from the sixth value; or, determining the partition of image area corresponding to the first part of the bitstream with TT splitting, when the first TT indicator is a seventh value; and determining the partition of image area corresponding to the first part of the bitstream without TT splitting, when the first TT indicator is an eighth value, wherein the seventh value is different from the eighth value.

It is noted that the present disclosure is not limited to providing the first indicator separately for both the TT and the BT splitting. Rather, there may be implementations in which there is only the first indicator for the TT or only the first indicator for the BT splitting. In other word, the present disclosure also works if the partitioning is only supported by means of TT or only supported by means of BT.

The above-mentioned method corresponds for the first TT indicator to the method shown in FIG. 13, in which in step S110 the first TT indicator is determined and depending on whether its value is a seventh or an eighth value, TT splitting is performed in step S120 or no TT splitting is performed in step S130. The above-mentioned method corresponds for the first BT indicator to the method shown in FIG. 13, in which in step S110 the first BT indicator is determined and depending on whether its value is a fifth or an sixth value, BT splitting is performed in step S120 or no BT splitting is performed in step S130.

Moreover, in some embodiments, the second indicator includes a second BT indicator and a second TT indicator and the method further comprises determining the partition of image area corresponding to the second part of the bitstream with BT splitting, when the second BT indicator is a ninth value; and determining the partition of image area corresponding to the second part of the bitstream without BT splitting and TT splitting, when the second indicator is a tenth value, wherein the ninth value is different from the tenth value; or, Determining the partition of image area corresponding to the second part of the bitstream with TT splitting, when the second TT indicator is an eleventh value; and determining the partition of image area corresponding to the second part of the bitstream without TT splitting, when the second indicator is a twelfth value, wherein the eleventh value is different from the twelfth value.

The method shown in FIG. 14 is applicable separately to the first/second TT indicator and to the first/second BT indicator and their handling as described above.

An exemplary apparatus is further provided in this embodiment (wherein the first indicator includes a first BT indicator and a first TT indicator). The apparatus comprises a partitioning configurer, which may correspond to the partitioning configurer 1520 for determining the partition of image area corresponding to the first part of the bitstream with BT splitting, when the first BT indicator is a fifth value; and determining the partition of image area corresponding to the first part of the bitstream without BT splitting, when the first BT indicator is a sixth value, wherein the fifth value is different from the sixth value. In addition or alternatively thereto, the partitioning configurer may be configured for determining the partition of image area corresponding to the first part of the bitstream with TT splitting, when the first TT indicator is a seventh value; and determining the partition of image area corresponding to the first part of the bitstream without TT splitting, when the first TT indicator is an eighth value, wherein the seventh value is different from the eighth value.

Moreover, in some embodiments, the second indicator includes a second BT indicator and a second TT indicator. The apparatus, similar to apparatus 1600, comprises the partitioning configurer 1630 for determining the partition of image area corresponding to the second part of the bitstream with BT splitting, when the second BT indicator is a ninth value; and determining the partition of image area corresponding to the second part of the bitstream without BT splitting and TT splitting, when the second indicator is a tenth value, wherein the ninth value is different from the tenth value. Alternatively, or in addition, the partitioning configurer 1630 is configured for determining the partition of image area corresponding to the second part of the bitstream with TT splitting, when the second TT indicator is an eleventh value; and determining the partition of image area corresponding to the second part of the bitstream without TT splitting, when the second indicator is a twelfth value, wherein the eleventh value is different from the twelfth value.

It is noted that any of the above-mentioned embodiments and examples of image partitioning methods and apparatuses may be employed within an image or video decoder or decoding method as well as image or video encoder and encoding method. The decoding method comprises any of the above-mentioned methods for image partitioning, and a step of decoding the partitioned areas including decoding of the partitioned coding blocks. The decoding may include any (e.g. hybrid) block-based decoding, for example HEVC or its further developments, as described above. The decoding and/or the determining of the first and/or second indications may further include the bitstream parsing.

Correspondingly, a decoder is provided comprising any of the apparatuses mentioned above for image partitioning, and a decoder for decoding the partitioned coding blocks.

The encoding method comprises any of the above-mentioned methods for image partitioning, and a step of encoding the partitioned coding blocks, and generating the bitstream. The bitstream generation may include inserting of the first or second indication and/or one or more partitioning restriction parameters into the bitstream as mentioned above. The encoding may include any (e.g. hybrid) block-based encoding, for example HEVC or its further developments, as described above.

Correspondingly, an encoder is provided comprising any of the apparatuses mentioned above for image partitioning, and an encoder for encoding the partitioned coding blocks, thereby generating the bitstream which may include the above-mentioned first and/or second flag and/or one or more partitioning restriction parameters.

The processing circuitry may include one or more processors which may be general-purpose processors or digital signal processors or the like. However, the present disclosure is not limited thereto and the processing circuitry may be any combination of specialized or programmable hardware and/or software. In some implementations, the processing circuitry or the entire decoder may be implemented on (embodied by) an integrated circuit.

The following logical operators are defined as follows.
x && y Boolean logical "and" of x and y
x||y Boolean logical "or" of x and y
! Boolean logical "not"
x ? y:z If x is TRUE or not equal to 0, evaluates to the value of y; otherwise, evaluates to the value of z.

The following relational operators are defined as follows.
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

The following bit-wise operators are defined as follows.
& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

What is claimed is:

1. A method of image partitioning, comprising:
   determining a first indicator, wherein the first indicator is shared by a first part of a bitstream, and wherein the first indicator indicates whether binary tree (BT) or ternary tree (TT) splitting is enabled;
   determining a partitioning of an image area corresponding to the first part of the bitstream with BT splitting or TT splitting when the first indicator takes a first value; and
   determining the partitioning of the image area corresponding to the first part of the bitstream without BT splitting and TT splitting when the first indicator takes a second value, wherein the first value is different from the second value, and wherein when the first indicator takes the second value, the partitioning of the image area without BT splitting and TT splitting comprises:
      setting a minimum luma size of a coding block from quadtree splitting as 4 or setting a minimum luma coding block size;
      setting a maximum hierarchy depth for multiple type tree splitting as 0; and
      setting a maximum luma size of a coding block from BT splitting as 0 or setting the minimum luma coding block size.

2. The method of claim 1, further comprising setting the maximum luma size of a coding block from TT splitting as 0 or setting the minimum luma coding block size.

3. The method of claim 2, further comprising deriving the maximum luma size of a coding block from TT splitting by parsing the bitstream.

4. The method of claim 1, wherein determining the first indicator comprises:
   deriving the first indicator by parsing the bitstream; or
   deriving a preset value of the first indicator.

5. The method of claim 1, wherein the first indicator is included in a first side information set of the first part of the bitstream.

6. The method of claim 5, wherein:
   the first side information set is a sequence parameter set when the first part is a sequence;
   the first side information set is a picture parameter set when the first part is a picture;
   the first side information set is a slice header when the first part is a slice; or
   the first side information set is a tile header when the first part is a tile.

7. The method of claim 1, wherein when the first part is a sequence and the first indicator takes the first value, the method further comprises:
   determining a second indicator, wherein the second indicator is shared by a second part of the bitstream;
   determining a partitioning of a second image area corresponding to a second part of the bitstream with BT splitting or TT splitting when the second indicator takes a third value; and
   determining the partitioning of the second image area corresponding to the second part of the bitstream without BT splitting and TT splitting when the second indicator takes a fourth value, wherein the third value is different from the fourth value.

8. The method of claim 7, wherein the second part of the bitstream is a picture, a slice or a tile.

9. The method of claim 7, wherein determining the second indicator comprises:
   deriving the second indicator by parsing the bitstream; or
   deriving a preset value of the second indicator.

10. The method of claim 7, wherein the second indicator is included in a second side information set of the second part of the bitstream, and wherein the second part of the bitstream is a part of the first part of the bitstream.

11. The method of claim 10, wherein when the first part is a sequence:
   the second side information set is a picture parameter set when the second part of the bitstream is a picture;
   the second side information set is a slice header when the second part is a slice; or
   the second side information set is a tile header when the second part is a tile.

12. The method of claim 10, wherein when the first part is a picture:
   the second side information set is a slice header when the second part is a slice; or
   the second side information set is a tile header when the second part is a tile.

13. The method of claim 7, wherein the second indicator includes a second BT indicator and a second TT indicator, and wherein the method further comprises:
   determining the partitioning of the image area corresponding to the second part of the bitstream with BT splitting when the second BT indicator takes a ninth value, and determining the partitioning of the image area corresponding to the second part of the bitstream without BT splitting and TT splitting when the second indicator takes a tenth value, wherein the ninth value is different from the tenth value; or
   determining the partitioning of the image area corresponding to the second part of the bitstream with TT splitting when the second TT indicator is takes eleventh value, and determining the partitioning of the image area corresponding to the second part of the bitstream without TT splitting when the second indicator takes a twelfth value, wherein the eleventh value is different from the twelfth value.

14. The method of claim 1, wherein the first indicator includes a first BT indicator and a first TT indicator, and wherein the method further comprises:
   determining the partitioning of the image area corresponding to the first part of the bitstream with BT splitting when the first BT indicator takes a fifth value, and determining the partitioning of the image area corresponding to the first part of the bitstream without BT splitting when the first BT indicator takes a sixth value, wherein the fifth value is different from the sixth value; or determining the partitioning of the image area corresponding to the first part of the bitstream with TT splitting when the first TT indicator takes a seventh value, and determining the partitioning of the image area corresponding to the first part of the bitstream without TT splitting when the first TT indicator takes an eighth value, wherein the seventh value is different from the eighth value.

15. An apparatus for image partitioning, comprising:
a processor; and
a memory coupled to the processor and configured to store instructions that, when executed by the processor, cause the apparatus to be configured to:
   determine a first indicator, wherein the first indicator is shared by a first part of a bitstream, and wherein the first indicator indicates whether binary tree (BT) or ternary tree (TT) splitting is enabled;
   determine a partitioning of an image area corresponding to the first part of the bitstream with BT splitting or TT splitting, when the first indicator takes a first value; and
   determine the partitioning of the image area corresponding to the first part of the bitstream without BT splitting and TT splitting, when the first indicator takes a second value, wherein the first value is different from the second value, and wherein when the first indicator takes the second value, the partitioning of the image area without BT splitting and TT splitting comprises:
      setting a minimum luma size of a coding block from quadtree splitting as 4 or setting a minimum luma coding block size;
      setting a maximum hierarchy depth for multiple type tree splitting as 0; and
      setting a maximum luma size of a coding block from BT splitting as 0 or setting the minimum luma coding block size.

16. The apparatus of claim 15, wherein the instructions further cause the apparatus to be configured to set the maximum luma size of a coding block from TT splitting as 0 or set the minimum luma coding block size.

17. A computer program product comprising computer-executable instructions stored on a non-transitory computer-readable medium that, when executed by a processor, cause an apparatus to:
   determine a first indicator, wherein the first indicator is shared by a first part of a bitstream, and wherein the first indicator indicates whether binary tree (BT) or ternary tree (TT) splitting is enabled;
   determine a partitioning of an image area corresponding to the first part of the bitstream with BT splitting or TT splitting, when the first indicator takes a first value; and
   determine the partitioning of the image area corresponding to the first part of the bitstream without BT splitting and TT splitting when the first indicator takes a second value, wherein the first value is different from the second value, and wherein when the first indicator takes the second value, the partitioning of the image area without BT splitting and TT splitting comprises:
      setting a minimum luma size of a coding block from quadtree splitting as 4 or setting a minimum luma coding block size;
      setting a maximum hierarchy depth for multiple type tree splitting as 0; and
      setting a maximum luma size of a coding block from BT splitting as 0 or setting the minimum luma coding block size.

18. The apparatus of claim 15, wherein the instructions further cause the apparatus to set the maximum luma size of a coding block from TT splitting as 0 or set the minimum luma coding block size.

19. The apparatus of claim 18, wherein the instructions further cause the apparatus to derive the maximum luma size of a coding block from TT splitting by parsing the bitstream.

20. The apparatus of claim 15, wherein the instructions further cause the apparatus to determine the first indicator by:
   deriving the first indicator by parsing the bitstream; or
   deriving a preset value of the first indicator.

* * * * *